United States Patent
Yoo

(10) Patent No.: US 8,973,130 B2
(45) Date of Patent: *Mar. 3, 2015

(54) DEVICE AND METHOD FOR PROVIDING SOC-BASED ANTI-MALWARE SERVICE, AND INTERFACE METHOD

(75) Inventor: InSeon Yoo, Yongin-Si (KR)

(73) Assignee: Samsung SDS Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/187,977

(22) Filed: Jul. 21, 2011

(65) Prior Publication Data

US 2012/0023584 A1    Jan. 26, 2012

(30) Foreign Application Priority Data

Jul. 21, 2010 (KR) .................. 10-2010-0070428
Jul. 14, 2011 (KR) .................. 10-2011-0069816

(51) Int. Cl.
G06F 21/56 (2013.01)
G06F 21/55 (2013.01)
H04L 29/06 (2006.01)

(52) U.S. Cl.
CPC ............ *G06F 21/567* (2013.01); *G06F 21/554* (2013.01); *G06F 21/564* (2013.01); *H04L 63/14* (2013.01); *H04L 63/145* (2013.01)
USPC .................. 726/22; 726/23; 726/24; 713/188

(58) Field of Classification Search
CPC ..................................................... G06F 21/567
See application file for complete search history.

(56) References Cited

U.S. PATENT DOCUMENTS

| | | | |
|---|---|---|---|
| 7,240,345 B2 | 7/2007 | Sueyoshi et al. | |
| 7,328,349 B2 | 2/2008 | Milliken | |
| 7,624,436 B2 | 11/2009 | Balakrishnan et al. | |
| 7,650,639 B2 | 1/2010 | Kramer et al. | |
| 7,757,290 B2 | 7/2010 | Costea et al. | |
| 7,839,854 B2 | 11/2010 | Alexander | |
| 7,840,763 B2 | 11/2010 | Murotake et al. | |
| 2004/0059943 A1 | 3/2004 | Marquet et al. | |

(Continued)

FOREIGN PATENT DOCUMENTS

| | | |
|---|---|---|
| CN | 1578227 A | 2/2005 |
| FR | 2862474 A1 | 5/2005 |

(Continued)

OTHER PUBLICATIONS

Tianzhou Chen; Jijun Ma; Nan Zhang; Qingsong Shi; , "A Virus Detection Framework based on SPMOS," Embedded Software and Systems, 2008. ICESS '08. International Conference on , vol., no., pp. 610-615, Jul. 29-31, 2008.*

(Continued)

*Primary Examiner* — Alexander Lagor
(74) *Attorney, Agent, or Firm* — Sughrue Mion, PLLC

(57) ABSTRACT

A device in which a system-on-chip (SOC) providing an anti-malware service is mounted and a method of performing the anti-malware service are provided. The device includes: a storage unit which stores a function library which is a collection of operations provided for use in the SOC providing the anti-malware service; and a scanning data sender which forms SOC transmission data with data to be scanned for viruses by calling at least one of the operations, and transmits the SOC transmission data to the SOC. Accordingly, a mobile device scans files for viruses and filters packets at a high speed.

20 Claims, 18 Drawing Sheets

(56) References Cited

U.S. PATENT DOCUMENTS

| | | | |
|---|---|---|---|
| 2004/0143751 | A1 | 7/2004 | Peikari |
| 2005/0216770 | A1 | 9/2005 | Rowett et al. |
| 2006/0265486 | A1 | 11/2006 | Killian et al. |
| 2007/0022479 | A1 | 1/2007 | Sikdar et al. |
| 2007/0240218 | A1 | 10/2007 | Tuvell et al. |
| 2007/0240219 | A1 | 10/2007 | Tuvell et al. |
| 2007/0240220 | A1 | 10/2007 | Tuvell et al. |
| 2007/0240221 | A1 | 10/2007 | Tuvell et al. |
| 2007/0240222 | A1 | 10/2007 | Tuvell et al. |
| 2008/0033942 | A1* | 2/2008 | Kao et al. ............... 707/6 |
| 2008/0163356 | A1 | 7/2008 | Won-Jip et al. |
| 2008/0184372 | A1 | 7/2008 | Hoshina |
| 2009/0016226 | A1 | 1/2009 | LaVigne et al. |
| 2009/0150996 | A1 | 6/2009 | Haswell |
| 2009/0240874 | A1 | 9/2009 | Pong |
| 2009/0249465 | A1* | 10/2009 | Touboul ............... 726/11 |
| 2009/0293126 | A1 | 11/2009 | Archer et al. |
| 2009/0320133 | A1 | 12/2009 | Viljoen et al. |
| 2010/0077482 | A1 | 3/2010 | Adams |
| 2010/0138909 | A1 | 6/2010 | Chen |
| 2010/0274755 | A1 | 10/2010 | Stewart |
| 2010/0281539 | A1 | 11/2010 | Burns et al. |
| 2011/0078799 | A1 | 3/2011 | Sahita et al. |

FOREIGN PATENT DOCUMENTS

| | | |
|---|---|---|
| JP | 11-259289 A | 9/1999 |
| JP | 2002-245414 A | 8/2002 |
| JP | 2004-252642 A | 9/2004 |
| JP | 2006-331422 A | 12/2006 |
| JP | 2008-186052 A | 8/2008 |
| JP | 2009-37598 A | 2/2009 |
| KR | 10-2001-0105116 A | 11/2001 |
| KR | 20030030044 A | 4/2003 |
| KR | 10-2004-0090373 A | 10/2004 |
| KR | 10-0750377 B1 | 8/2007 |
| KR | 10-2007-0111816 A | 11/2007 |
| KR | 10-2008-0056548 A | 6/2008 |
| KR | 10-2008-0074271 A | 8/2008 |
| KR | 10-2008-0113087 A | 12/2008 |

OTHER PUBLICATIONS

Lockwood, John, et al. "An extensible, system-on-programmable-chip, content-aware Internet firewall." Field Programmable Logic and Application (2003): 859-868.*

Ajami, R., "Embedded Network Firewall on FPGA", Nov. 2010, pp. 1-87, Retrieved from the Internet on Jun. 9, 2011 ,http://library2.usask.ca/theses/available/etd-11182010-144050/unrestricted/RaoufAjami_MScTesis_UofS.pdf>.

Lockwood, J., et al., "An Extensible, System-On-Programmable-Chip, Content-Aware Internet Firewall", 2003, pp. 1-10, Retrieved from the Internet on Jun. 9, 2011, <http://www.globalvelocity.info/public/whitepapers/content_aware_internet_firewall_fpga_global_velocity.pdf>.

International Search Report (PCT/ISA/210) dated Nov. 17, 2010, in International Application No. PCT/KR2010/001851.

Freescale and Kaspersky. "Accelerated Antivirus Solution Platform for OEM Vendors" White Papers. 2007 [retrieved on Aug. 6, 2011] Retrieved from the Internet<URL:http://www.freescale.com/files/32bit/doc/white_paper/KASPERSKYWP.pdf>, 16 pages.

Kim et al. "An Efficient Multi-hash Pattern Matching Scheme for Intrusion Detection in FPGA-based Reconfiguring Hardware." Proceedings of the 8th WSEAS International Conference on Applied Computer Science (ACS 2008), pp. 199-204. [retrieved on Aug. 6, 2011] Retrieved from the Internet<URL:http://www.wseas.us/e-library/conferences/2008/venice/acs/acs32.pdf>.

S. Venkatesan et al. "Advanced mobile agent security models for code integrity and malicious availability check." Journal of Network and Computer Applications. vol. 33, Issue 6. Nov. 2010, pp. 661-671 [retrieved on Aug. 6, 2011] Retrieved from the Internet<URL:http://www.sciencedirect.com/science/article/pii/S1084804510000457>.

Communication issued Jun. 19, 2012 by the European Patent Office in counterpart European Application No. 11174713.5.

Chen, Zhen et al. "AntiWorm NPU-based Parallel Bloom Filters for TCP/IP Content Processing in Giga-Ethernet LAN", Local Computer Networks, Nov. 15, 2005, pp. 1-8, XP010859289.

Chiong, Raymond et al. "On the Insecurity of Personal Firewall", Information Technology, Aug. 26, 2008, pp. 1-10, XP031325957.

Susilo, Willy et al. "Personal Firewall for Pocket PC 2003: Design & Implementation", Advanced Information Networking and Applications, vol. 2, Mar. 25, 2005, pp. 661-666, XP010790093.

Allan, Alan et al. "2001 Technology Roadmap for Semiconductors", Computer, IEEE Service Center, vol. 35, No. 1, Jan. 1, 2002, pp. 42-53, XP011093993.

Communication, dated Sep. 3, 2013, issued by the State Intellectual Property Office of the People's Republic of China, in counterpart Application No. 201110208502.X.

Communication dated Nov. 24, 2014 issued by the State Intellectual Property Office of the People's Republic of China in counterpart Chinese Application No. 201110208502.

* cited by examiner

DEVICE AND METHOD FOR PROVIDING SOC-BASED ANTI-MALWARE SERVICE, AND INTERFACE METHOD

CROSS-REFERENCE TO RELATED APPLICATIONS

This application claims priorities from Korean Patent Application No. 10-2010-0070428, filed on Jul. 21, 2010, and Korean Patent Application No. 10-2011-0069816, filed on Jul. 14, 2011, in the Korean Intellectual Property Office, the disclosure of which is incorporated herein by reference in its entirety.

BACKGROUND

1. Field

Methods and apparatuses consistent with exemplary embodiments relate to a device and method for providing a system-on-chip (SOC)-based anti-malware service, and an interface method.

2. Description of the Related Art

Malware refers to software or a code that disturbs operation of a system or exposes the system to danger like viruses, adware, spyware, or Trojan horses. The malware infects a system in various ways. For example, the system may be infected by the malware just by opening an email or accessing a specific website.

An anti-malware system refers to a system that prevents damage which may be caused by the malware and fixes the damage, and includes a firewall or a virus scanning engine.

With the development of communication technologies, new malware has appeared and existing malware has become diversified. Therefore, the anti-malware system should detect new malware besides the existing malware and thus needs to be operated at a high speed. In particular, a mobile device, which has limited resources, requires an anti-malware system capable of detecting malware at a high speed using few resources.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a device and a method for providing a system-on-chip (SOC)-based anti-malware service, which can perform a virus scanning operation and a packet data filtering at a high speed.

One or more exemplary embodiments also provide a method for interfacing between a SOC and a device which provides an anti-malware service.

One or more exemplary embodiments also provide an interface for an anti-malware SOC, by which the anti-malware SOC is used dedicatedly, a separate malware detection engine is added to an application terminal as a multi-engine to be able to deal with various viruses along with the anti-malware SOC, and works of high loads are performed through the SOC, so that use of resources such as a battery, a central processing unit (CPU), or a memory is minimized. Also, by performing security works through the application terminal and the SOC terminal, a safer security solution can be provided.

According to an aspect of an exemplary embodiment, there is provided a device in which a system-on-chip (SOC) providing an anti-malware service is mounted, the device including: a storage unit which stores a function library which is a collection of operations provided for use in the SOC providing the anti-malware service; and a scanning data sender which forms SOC transmission data with scanning data to be scanned for viruses by calling at least one of the operations, and transmits the SOC transmission data to the SOC, wherein the operations relate to at least one of virus scanning, packet data filtering, virus pattern DB updating, and rule pattern DB updating, which are performed in the SOC.

According to an aspect of another exemplary embodiment, there is provided a method of providing a SOC-based anti-malware service of a device, the method including: by the device, forming SOC transmission data which comprises an item indicating a type of the anti-malware service and a command; and by the device, transmitting the SOC transmission data to the SOC, wherein the SOC performs a virus scanning operation or a packet filtering operation according to the command included in the SOC transmission data.

According to an aspect of still another exemplary embodiment, there is provided a method of providing a SOC-based anti-malware service, the method including: storing a function library which is a collection of operations for use in a SOC in a device in which the SOC is mounted; by the device, forming SOC transmission data with scanning data to be scanned for viruses by calling at least one of the operations included in the function library; and, by the device, transmitting the SOC transmission data for the scanning data to the SOC, wherein the operations relate to at least one of virus scanning, packet data filtering, virus pattern DB updating, and rule pattern DB updating, which are performed in the SOC.

According to one or more exemplary embodiments, the virus scanning operation and the packet data filtering are performed at a high speed. For example, a mobile device according to an exemplary embodiment, which has limited resources, can scan files for viruses and filter packets at a high speed by consuming few resources.

According to one or more exemplary embodiments, the SOC providing the anti-malware system and the device can be interfaced.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which.

DETAILED DESCRIPTION OF EXEMPLARY EMBODIMENTS

Figure 1:
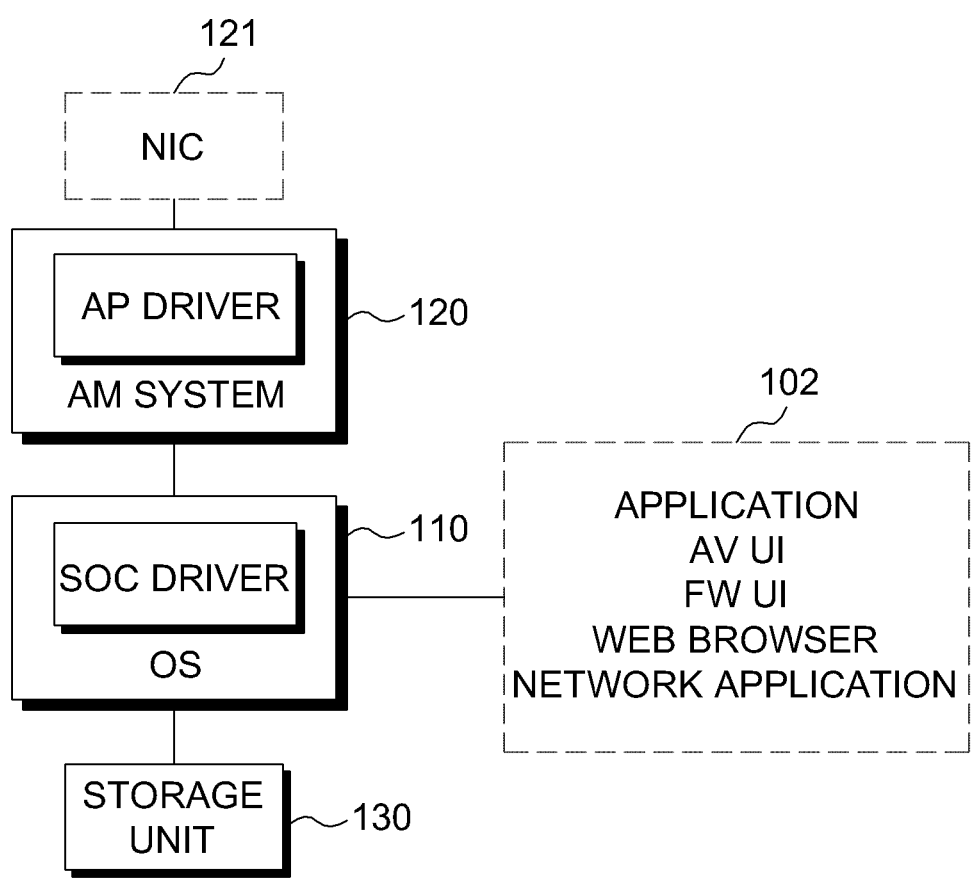
FIG. 1 is a block diagram illustrating a device according to an exemplary embodiment.

Exemplary embodiments will now be described more fully with reference to the accompanying drawings to clarify aspects, features and advantages. This inventive concept may, however, be embodied in many different forms and should not be construed as limited to the exemplary embodiments set forth herein. Rather, these exemplary embodiments are provided so that this disclosure will be thorough and complete, and will fully convey the scope of exemplary embodiments to those of ordinary skill in the art. It will be understood that when an element, layer or region is referred to as being "on" another element, layer or region, the element, layer or region can be directly on another element, layer or region or intervening elements, layers or regions.

The terms used herein are for the purpose of describing particular exemplary embodiments only and are not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, layers, regions, elements, components, and/or groups thereof, but do not preclude the presence or addition of one or more other features, integers, steps, operations, layers, regions, elements, components, and/or groups thereof. As used herein, the term "and/or" includes any and all combinations of one or more of the associated listed items.

As the inventive concept allows for various changes and exemplary embodiments, particular exemplary embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope of the present inventive concept are encompassed in the present inventive concept. In the description of exemplary embodiments, certain detailed explanations of related art are omitted when it is deemed that they may unnecessarily obscure the essence of the inventive concept.

FIG. 1 is a block diagram illustrating a device 100 in which a system-on-chip (SOC) for providing an anti-malware service is mounted according to an exemplary embodiment.

Referring to FIG. 1, a device 100 according to an exemplary embodiment includes an operating system (OS) 110, an anti-malware system 120 (hereinafter, referred to as an 'AM system') to provide an anti-malware service, a storage unit 130 to store data, and an application 102 related to the anti-malware service.

In the present exemplary embodiment, albeit not shown, the device 100 may further include a central processing unit (CPU), a BUS, a memory, and another storage unit to perform operations of the aforementioned elements. For example, programs such as applications or operating systems may be stored in a certain storage unit such as a hard disk drive (HDD) or a non-volatile memory and may be loaded into a main memory to be operated under control of the CPU. Since it is well known that the programs are loaded into the memory and operated under control of the CPU, this operational principle will be omitted when the operation of the programs are explained below. Also, although hardware such as a storage unit to store programs, a processor, and a memory is included, this hardware is not illustrated in the drawings for convenience of understanding.

The AM system 120 may perform a virus scanning operation and/or a packet data filtering operation, and may be realized as a SOC so that the AM system 120 can be mounted in a network communicable device such as a desktop, a laptop, a smart phone, and a tablet personal computer.

The AM system 120 receives data to be scanned for viruses (hereinafter, referred to as 'scanning data') from the device 100, scans whether there is a virus in the scanning data, and notifies the device 100 of a result of the scanning.

The AM system 120 stores a virus pattern database (DB) and performs the virus scanning operation using the virus pattern DB. The AM system 120 receives data for updating the virus pattern DB from the device 100 and updates the pre-stored virus pattern DB using the received data.

In this specification, the term 'virus' refers to all types of malware that harm the operation of the device 100 such as a malicious code, Trojan horses, spyware, adware and other malware data known in the related art.

The AM system 120 determines whether to 'pass' or 'block' packet data by applying a filtering rule to the packet data, and performs a filtering operation of passing or blocking the packet data according to a result of the determination. The packet data filtered by the AM system 120 is data that the AM system 120 has received from the device 100 or received directly from an external source. The AM system 120 stores a rule pattern DB and performs the filtering operation using the rule pattern DB. The AM system 120 receives data for updating the rule pattern DB from the device 100 and updates the pre-stored rule pattern DB using the received data.

The AM system 120 may include an AP driver to exchange data with the SOC driver. According to an exemplary embodiment, the SOC driver includes a driver to exchange SOC transmission data and a driver to exchange packet data.

The application 102 includes at least one of an application for providing a user interface related to the virus scanning operation of the AM system 120 (hereinafter, referred to as an anti-virus (AV) user interface (UI) application), an application for providing a user interface related to the filtering operation of the AM system 120 (hereinafter, referred to as a firewall (FW) UI application), and an application using packet data to be filtered such as a web browser or a network application.

The AV UI application may receive a command on the virus scanning operation from a user, and may receive a result of the virus scanning by the AM system 120 and display the result for the user. Also, the AV UI application may receive a scanning schedule on the virus scanning operation from the user and store the scanning schedule. Accordingly, the AV UI application may refer to the scanning schedule stored by the device 100 and may instruct the AM system 120 to perform the scanning operation according to the scanning schedule. Also, the AV UI application may update the virus pattern DB. For example, the AV UI application refers to a pre-stored update schedule, requests and receives a virus pattern DB for updating from an update server according to the update schedule, and transmits the virus pattern DB for updating to the AM system 120.

The FW UI application may provide an FW operating operation, an FW stopping operation, a rule adding operation, a rule changing operation, a specific rule removing operation, a whole rule removing operation, a rule state displaying operation, an operation of outputting a packet log applied to each rule, and a basic rule setting changing operation.

For example, the FW UI application may receive a rule regarding the packet data filtering operation from the user, and may receive a result of the packet data filtering from the AM system 120 and display the result for the user. Also, the FW UI application updates the rule pattern DB.

The web browser or the network application such as an FTP, a messenger, or SNS software exchanges packet data with a server side.

The OS 110 of the device 100 includes a SOC driver to operate the AM system 120.

The storage unit 130 may store the scanning data. The scanning data includes, for example, an execution file, a document file, and a data file and is an object to be scanned for viruses by the AM system 120.

The storage unit 130 may also store virus scanning setting information and filtering setting information. The virus scanning setting information includes at least one of the scanning schedule and the update schedule of the virus pattern DB, and the filtering setting information includes information regarding the filtering rule input by the user.

The storage unit 130 may store a rule list converted from the filtering rule input by the user.

The storage unit 130 may store a function library that is a collection of functions, i.e., operations, provided for use in the AM system 120. The functions may relate to at least one of the virus scanning operation, the packet data filtering operation, the virus pattern DB updating operation, and the rule pattern DB updating operation. The term "relate" indicates that the respective operations are used directly or indirectly to perform the above-described operations.

The storage unit 130 refers to, but not limited to, a recording medium such as an HDD, a solid state drive (SSD), a memory, etc. Also, although one storage unit 130 is illustrated in FIG. 1, it is understood that another exemplary embodiment is not limited thereto, and two or more recording media may be included according to another exemplary embodiment. For example, the storage unit 130 may include a first storage unit to store the scanning data, a second storage unit to store the scanning setting information and the filtering setting information, and a third storage unit to store the rule list.

A network interface card (NIC) 121 is adapted to transmit or receive the packet data to or from a packet data network, and is mounted in the AM system 120 as a part of the AM system 120. For example, the NIC 121 may receive the packet data through a wired or wireless LAN and the AM system 120 filters the packet data received through the NIC 121 and transmits the filtered packet data to the SOC driver.

Figure 2:
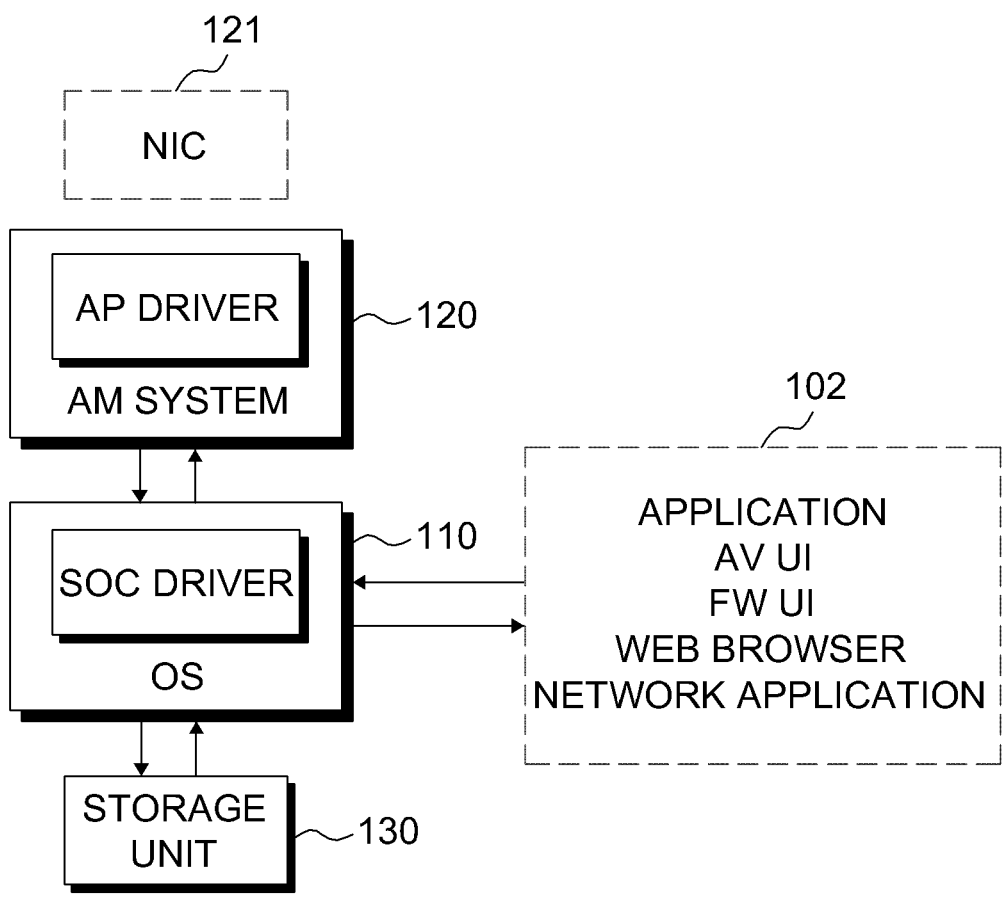
FIG. 2 is a block diagram to explain an operation of the device of FIG. 1.

Albeit not shown in FIG. 1, the device 100 may further include a communication interface unit (not shown) to operate a SOC using a function library and a protocol unit (not shown) adapted to exchange an operating command and an operation with the SOC through the communication interface unit FIG. 2 is a block diagram to explain an operation of the device 100. Hereinafter, a virus scanning operation will be explained with reference to FIG. 2 according to an exemplary embodiment.

The AV UI application may instruct the AM system 120 to perform a virus scanning operation with respect to virus scanning data. For example, the AV UI application may receive a command to scan from the user or may instruct the AM system 120 to perform the virus scanning operation based on virus scanning setting information stored in the storage unit 130.

According to an exemplary embodiment, the AV UI application forms SOC transmission data with the scanning data and transmits the SOC transmission data to the SOC driver. The SOC driver transmits the SOC transmission data received from the AV UI application to the AP driver. After that, the AM system 120 performs the virus scanning operation with respect to the scanning data included in the SOC transmission data received by the AP driver, and transmits a result of the virus scanning operation to the SOC driver through the AP driver. The SOC driver transmits the result of the virus scanning operation to the AV UI application and the AV UI application displays the result of the virus scanning operation for the user.

Figure 11:
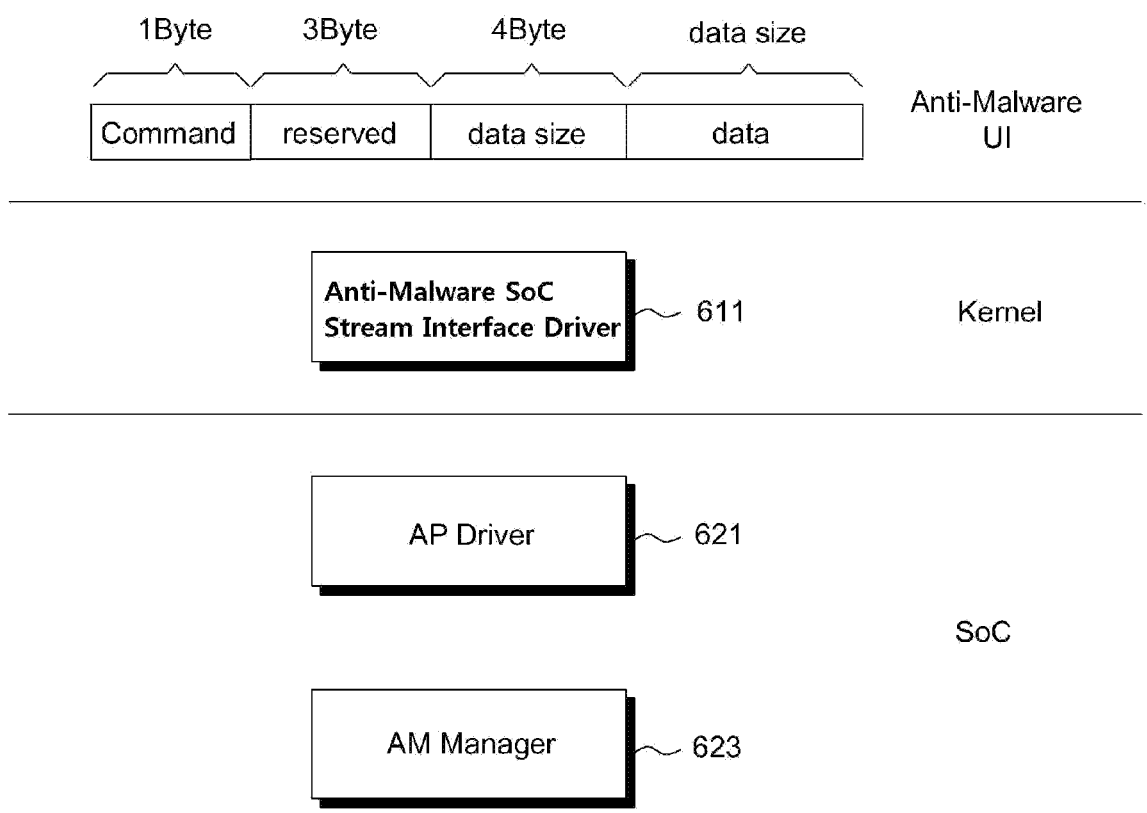
FIG. 11 is a view illustrating system-on-chip (SOC) transmission data according to an exemplary embodiment.

The SOC transmission data for the scanning data, which is formed by the AV UI application may have a data format as shown in FIG. 11. Specifically, the SOC transmission data may include a command item indicating a type of a command, a reserved item considering a potential extension, a data size item, and a data item. The scanning data or updating data is inserted into the data item.

According to an exemplary embodiment, the command item indicates a type of an operation to be performed by the AM system 120 and also indicates whether the operation to be performed by the AM system 120 is the virus scanning operation or the filtering operation. For example, if a command inserted in the command item is one of 1 to 100, the command represents a virus scanning-related command, and if the command inserted in the command item is one of 101 to 200, the command represents a filtering-related command. In this case, the command indicates a type of an operation to be performed and also indicates whether the operation is related to the filtering operation or the virus scanning operation. However, the command may indicate only the type of the operation to be performed by the AM system 120 and an additional item indicating whether the operation is related to the virus scanning operation or the filtering operation may be separately provided.

The 'SOC transmission data' recited in this specification has the format shown in FIG. 11 unless mentioned otherwise, though it is understood that one or more other exemplary embodiments are not limited thereto. For example, the SOC transmission data for the virus scanning includes a command to perform the virus scanning operation and the scanning data, and the SOC transmission data for the updating includes a command to update and data to be updated.

The AV UI application 102 may form the SOC transmission data for the virus scanning data by calling at least one of the operations included in the function library stored in the storage unit 130.

Referring to FIG. 2, an operation of updating the virus pattern DB stored in the AM system 120 will be explained. The AV UI application determines whether a time to update a virus pattern DB has arrived or not by referring to virus scanning setting information stored in the storage unit 130.

If it is determined that the time to update the virus pattern DB has arrived, the AV UI application requests an update server (not shown) to transmit a virus pattern DB for updating. Upon receiving the virus pattern DB for updating from the update server, the AV UI application forms SOC transmission data by calling the operations that are used for updating the virus pattern DB from files of the function library stored in the storage unit 130.

The AV UI application transmits the SOC transmission data for the virus pattern DB to the SOC driver, and the SOC driver transmits the SOC transmission data to the AP driver. The AM system 120 updates the pre-stored virus pattern DB with the virus pattern DB for updating received by the AP driver.

In the present exemplary embodiment, the AV UI application requests the virus pattern DB for updating from the update server. However, this is merely an example, and another exemplary embodiment is not limited thereto. For example, according to another exemplary embodiment, if there is no request from the AV UI application but there is a virus pattern DB to be updated, the update server may transmit data for updating to the AV UI application.

Also, in the present exemplary embodiment, the update server may store data for updating the anti-virus scanning engine and the firewall engine operated in the AM system 120, in addition to the virus pattern DB for updating. In this case, the AV UI application receives the data for updating the anti-virus scanning engine and the firewall engine from the update server and transmits the data for updating to the AM system 120.

Referring to FIG. 2, an operation of updating the rule pattern DB stored in the AM system 120 will be explained below. The FW UI application receives a filtering rule from the user and stores the filtering rule in the storage unit 130. After that, the FW UI application converts the rule stored in the storage unit 130 into a rule list of a predetermined format, and forms SOC transmission data with the rule list and transmits the SOC transmission data to the SOC driver. The FW UI application may form the SOC transmission data for the rule list by calling the operations included in the function library stored in the storage unit 130.

The SOC driver transmits the SOC transmission data for the rule list to the AP driver. The AM system 120 converts the rule list into a pattern DB of a predetermined format and updates the pre-stored rule pattern DB using the converted pattern DB.

Figure 3:
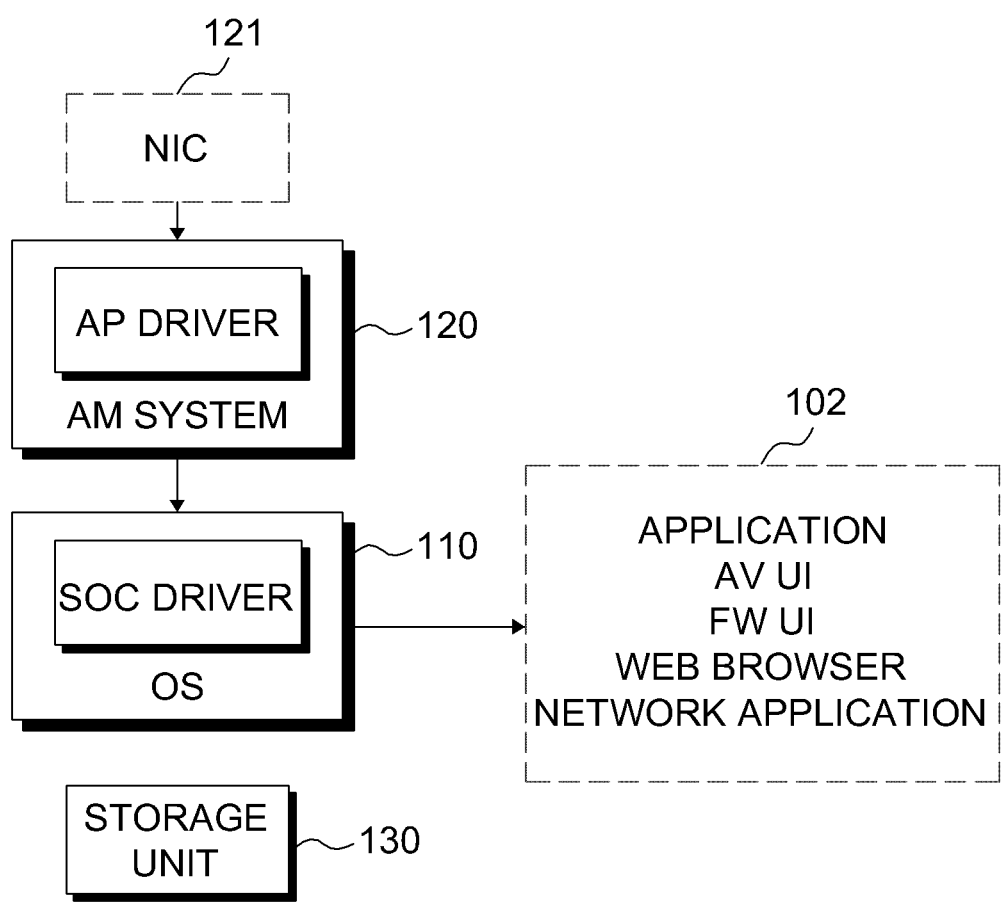
FIG. 3 is a block diagram to explain an operation of the device of FIG. 1.

FIG. 3 is a block diagram illustrating an operation of the device of FIG. 1, according to an exemplary embodiment. Referring to FIG. 3, a packet data filtering operation will be explained below. If the NIC 121 receives packet data, the AM system 120 determines whether to pass the packet data received by the NIC 121 or not by applying a pre-stored rule pattern DB. If the AM system 120 decides to 'pass' the packet data, the AM system 120 transmits the packet data received by the NIC 121 to the SOC driver and the SOC driver transmits the packet data to the web browser or the network applications such as FTP, Messenger, or SNS Software.

On the other hand, if the AM system 120 decides to 'block' the packet data, the AM system 120 does not transmit the packet data received by the NIC 121 to the SOC driver and deletes the packet data.

In the present exemplary embodiment, the AM system 120 performs a filtering operation with respect to the packet data received by the NIC 121. However, the AM system 120 may perform the filtering operation and the scanning operation simultaneously. In other words, the AM system 120 performs the filtering operation with respect to the packet data received by the NIC 121, and simultaneously performs the scanning operation to determine whether there is a virus in the packet data.

When performing the filtering operation and the scanning operation simultaneously, the AM system 120 does not transmit the packet data to the SOC driver and deletes the packet data if there is a virus in the packet data regardless of whether the packet data has been passed. Performing the filtering operation and the scanning operation simultaneously will be explained in detail below with reference to FIG. 5.

The following explanation relates to how the web browser or the network application transmits the packet data to the outside. In this case, the packet data is transmitted in a direction opposite to the arrow direction of FIG. 3. In other words, if the web browser or the network application transmits the packet data to the SOC driver, the AM system 120 transmits the packet data to the outside through the NIC 121.

Figure 4:
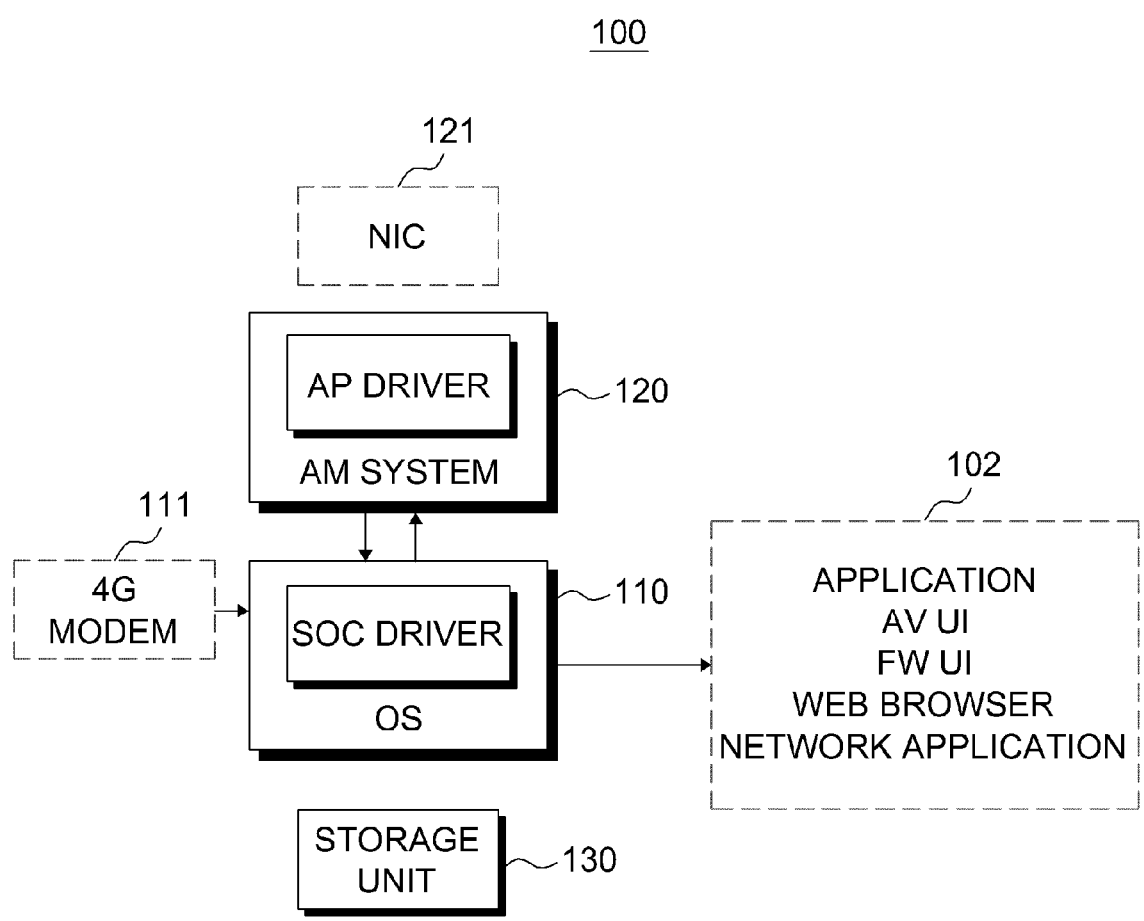
FIG. 4 is a block diagram illustrating a device according to another exemplary embodiment.

FIG. 4 is a block diagram illustrating a device 100 according to another exemplary embodiment. Referring to FIG. 4, the device 100 further includes a 4G modem 111. The device 100 receives or transmits packet data through the 4G modem 111.

In the present exemplary embodiment, the 4G modem 111 transmits or receives the packet data through a data network of mobile communication. The 4G modem 111 is used for mobile communications and may be a long term evolution (LTE) or a WiBro/WiMAX terminal modem which is one of 4 G communication technologies. Since any modem that can transmit or receive the packet data through the data communication network can be used, a data network modem other than the 4G modem can be used according to another exemplary embodiment.

If the 4G modem 111 receives the packet data, the SOC driver transmits the packet data to the AM system 120. The AM system 120 filters the packet data and returns the packet data to the SOC driver only if it is decided that the packet data is to be 'passed'. After that, the SOC driver transmits the packet data to the web browser or the network application. In the exemplary embodiment of FIG. 4, the AM system 120 may perform a filtering operation and a scanning operation with respect to the packet data received through the 4G modem 111, simultaneously.

The 4G modem 111 may be an LTE terminal modem, which is one of 4 G communication technologies. For example, the 4G modem 111 may receive and convert high-quality moving picture data.

Figure 5:
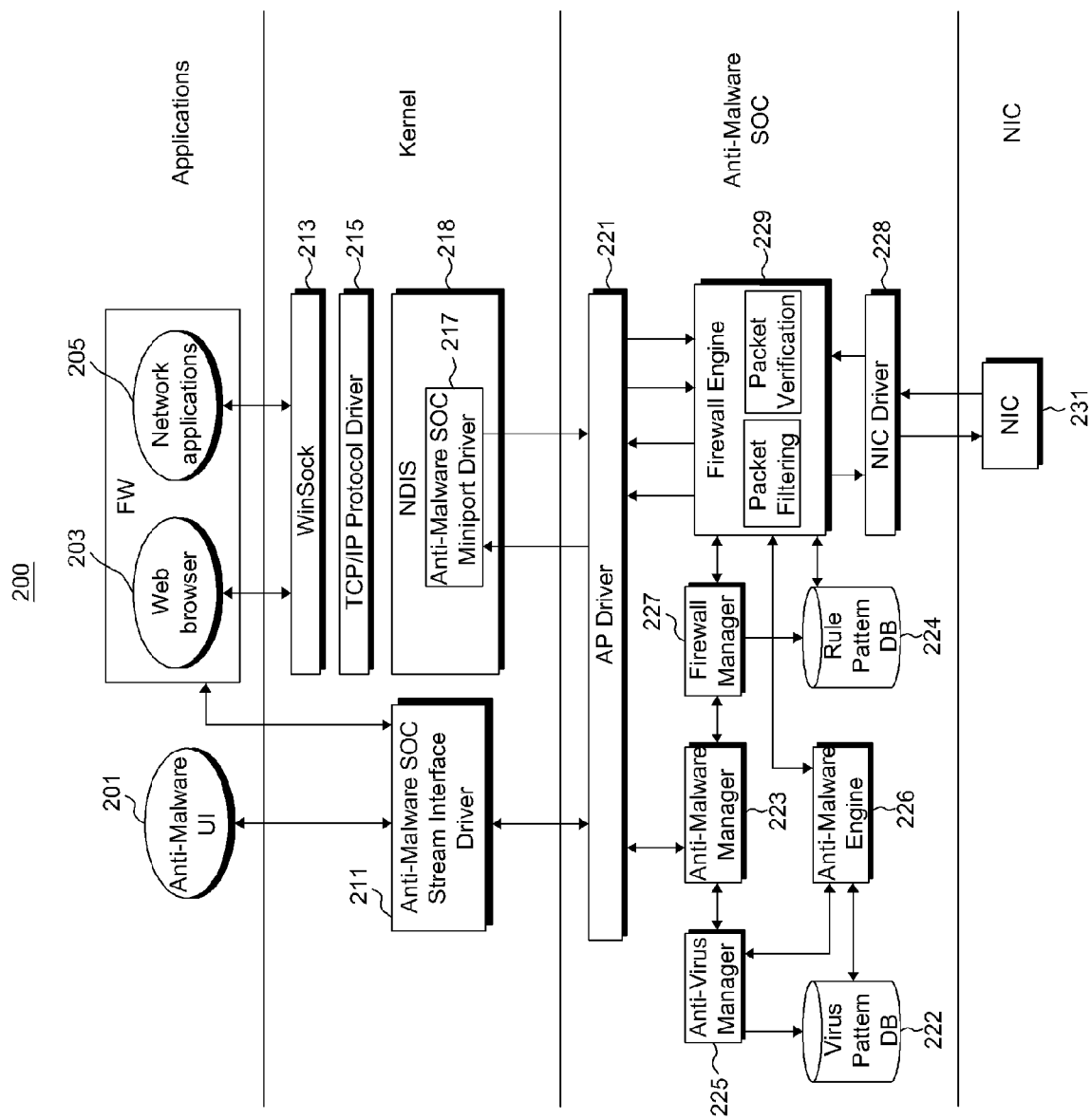
FIG. 5 is a block diagram illustrating a device according to still another exemplary embodiment.

FIG. 5 is a block diagram illustrating a device 200 according to still another exemplary embodiment. In FIG. 5, an AM system that is realized based on a SOC is mounted in the device 200.

Referring to FIG. 5, the device 200 includes an application, an anti-malware SOC stream interface driver 211, and an anti-malware SOC mini port driver 217.

The application of the device 200 includes an anti-malware UI application 210, a web browser 203, and a network application 205. The anti-malware UI application includes an AV UI application and an FW UI application and is called an 'AM UI application' if it is not necessary to distinguish between the AV UI application and the FW UI application.

The anti-malware SOC stream interface driver 211 (hereinafter, referred to as a 'stream interface driver') may receive data from the AM UI application and transmit the data to an AP driver 221 of the anti-malware SOC, or may receive data from the AP driver 221 and transmit the data to the AM UI application.

According to an exemplary embodiment, the stream interface driver 211 may receive SOC transmission data generated by the AM UI application and transmit the SOC transmission data to the AP driver 221. The SOC transmission data may have the format shown in FIG. 11, for example, and may be SOC transmission data for scanning data, SOC transmission data for a virus pattern DB, or SOC transmission data for a rule list.

The anti-malware SOC mini port driver 217 (hereinafter, referred to as a 'mini port driver') may receive packet data from FW applications such as a web browser or a network application and transmit the packet data to the AP driver 221, or may receive packet data from the AP driver 221 and transmit the packet data to the FW applications.

According to an exemplary embodiment, the mini port driver 217 may perform a filtering operation for each process prior to transmitting the packet data to the AP driver 221. If there is a rule set for each process by the user, the corresponding rule is stored in an area managed by a kernel. If the mini port driver 217 receives the packet data from the FW applications, the mini port driver 217 recognizes an owner process and compares the rule for each process with the owner process to determine whether to pass the packet data.

If the packet data is exchanged using a TCP/IP protocol, the device 200 includes a TCP/IP protocol driver 215 as shown in FIG. 5. Also, if the device 200 uses a WINDOWS OS, the device 200 includes a WinSoCk 213. The operations of the TCP/IP protocol driver 215 and the WinSoCk 213 are well known in the related art and thus a detailed explanation thereof will be omitted herein. If the device 200 uses a different protocol, different from the TCP/IP protocol, the device 200 may include a driver to use the different protocol. Also, if the device 200 uses a different OS, different from the WINDOWS OS, the device 200 may include a different element instead of the WinSoCk 213.

The device 200 may mount an anti-malware SOC to perform a virus scanning operation and a filtering operation.

The anti-malware SOC mounted in the device 200 includes the AP driver 221, an anti-malware manager 223 (hereinafter, referred to as an 'AM manager'), an anti-virus manager 225 (hereinafter, referred to as an 'AV manager'), a firewall manager 227 (hereinafter, referred to as an 'FW manager') 227, an anti-malware engine 226 (hereinafter, referred to as an 'AV engine'), a virus pattern DB 222, a rule pattern DB 224, a firewall engine 229 (hereinafter, referred to as an 'FW engine') 229, a NIC driver 228, and an NIC 231.

The AP driver 221 receives data from the stream interface driver 211 or the mini port driver 217 and transmits the data to the AM manager 223 if the data is received from the stream interface driver 211 and transmits the data to the FW engine 229 if the data is received from the mini port driver 217.

The AM manager 223 parses the data transmitted from the AP driver 221 and determines to which of the AV manager 225 and the FW manager 227 to transmit the data. For example, the AM manager 223 identifies a command included in the SOC transmission data and determines to which of the AV manger 225 and the FW manager 227 to transmit the data.

According to an exemplary embodiment, the command included in the SOC transmission data indicates whether the command relates to scanning or filtering. The AM manager 223 does not necessarily identify what operation the command specifically instructs and only identifies whether the command relates to the scanning or the filtering and transmits the data to a corresponding element.

The AV manager 225 parses the SOC transmission data transmitted from the AM manager 223, identifies the command, and performs an operation corresponding to the command. For example, if the command indicates an instruction to perform the virus scanning, the AV manager 225 instructs the AV engine 226 to perform the virus scanning operation. The AV engine 226 applies the virus pattern DB 222 to the scanning data included in the SOC transmission data and determines whether there is a virus in the scanning data.

The AV engine 226 notifies the AV manager 225 of a result of determining the existence of a virus, the AV manager 225 notifies the AM manager 223 of the result, the AM manager 223 notifies the AP driver 221 of the result, the AP driver 221 notifies the stream interface driver 211 of the result, and the stream interface driver 211 notifies the AM UI application 201 of the result.

If the command relates to updating of the virus pattern DB as a result of parsing the SOC transmission data, the AV manager 225 updates the pre-stored virus pattern DB 222 using the virus pattern DB for updating included in the SOC transmission data.

If the command relates to filtering as a result of parsing the SOC transmission data, the AM manager 223 transmits the data to the FW manager 227. The FW manager 227 parses the SOC transmission data, identifies a command, and performs an operation corresponding to the command. For example, if the command relates to updating the rule pattern DB 224, the FW manager 227 converts a rule list included in the SOC transmission data into a rule pattern and updates the pre-stored rule pattern DB 224 using the converted rule pattern.

If the AP driver 221 receives data from the mini port driver 213, the AP driver 221 transmits the data to the FW engine 229. The FW engine 229 goes through a packet verification process and then performs a packet filtering operation. The packet verification process is to prevent an attack such as Syn flooding, for example. Korean Patent No. 10-806492 titled 'Method for preventing a service rejection attack using TCP status shift' discloses an example of the packet verification process and is incorporated into the present specification within a range without conflicting with the present disclosure.

The FW engine 229 transmits the data received from the AP driver 221 to the NIC driver 228 only if the data is determined to be 'passed' as a result of the packet filtering operation. The NIC driver 228 transmits the data received from the FW engine 229 to the NIC 231. After that, the NIC 231 transmits the data to an external network.

On the other hand, if the NIC 231 receives packet data from an external network, the NIC driver 228 transmits the packet data to the FW engine 229. The FW engine 229 goes through the packet verification process and then performs the packet filtering operation.

In the present exemplary embodiment, the FW engine 229 determines whether the packet data contains data to be scanned for viruses or not, and if it is determined that data to be scanned for viruses such as a file or a scripter is contained, the FW engine 229 informs the AV engine 226 that virus scanning will be performed for the packet data. The AV engine 226 receives the packet data from the FW engine 229 and scans whether there is a virus in the packet data by applying the virus pattern DB 222 to the received packet data, and notifies the FW engine 229 of a result of the scanning operation.

If the FW engine 229 is informed by the AV engine 226 that a virus exists in the packet data, the FW engine 229 does not transmit the packet data to the AP driver 221 and deletes (i.e., discards) the packet data.

The FW engine 229 transmits the packet data to the AP driver 221 only if it is determined that the packet data is to be passed as a result of the packet filtering operation and if it is determined that no virus exists in the packet data. The AP driver 221 transmits the packet data to the mini port driver 217 and then the packet data is transmitted to a FW driver through the TCP/IP protocol driver 215.

As described above, in the exemplary embodiment of FIG. 5, the AV engine 226 receives the data to be scanned for viruses from the AV manager 225. However, the AV engine 226 may receive the data to be scanned for viruses from the FW engine 229.

Also, albeit not shown in FIG. 5, the device 200 may further include a function library which is a collection of functions for the operation of the AM SOC and the AM UI application may call at least one of the functions included in the function library to form the SOC transmission data.

Figure 6:
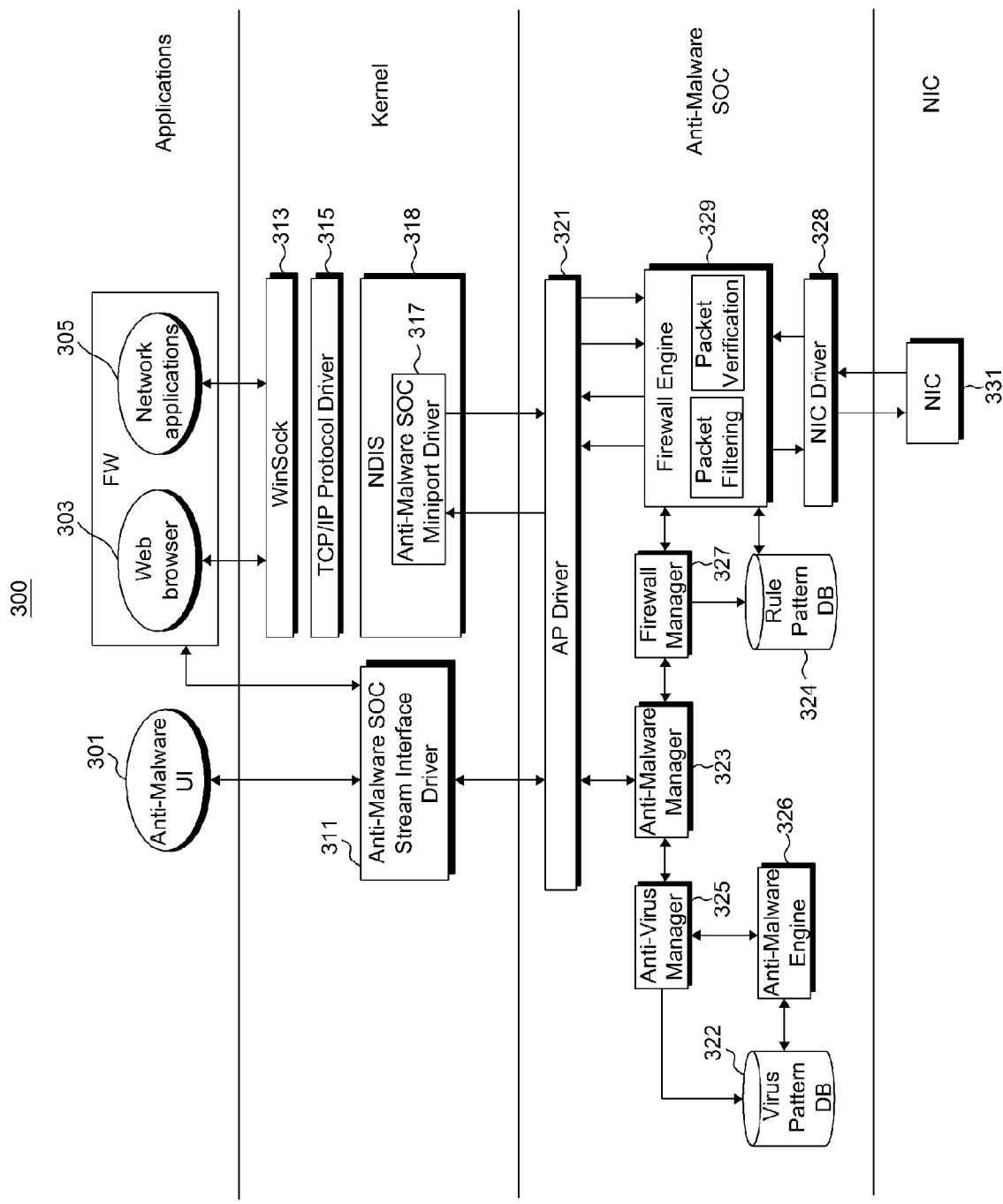
FIG. 6 is a block diagram illustrating a device according to still another exemplary embodiment.

FIG. 6 is a block diagram illustrating a device 300 according to still another exemplary embodiment.

The exemplary embodiment of FIG. 6 differs from the exemplary embodiment of FIG. 5 in that, with respect to packet data received by an NIC 331, a virus scanning operation is not performed and only a filtering operation is performed. In other words, an FW engine 329 goes through a packet verification process and performs a filtering operation with respect to the packet data received by the NIC 331. If it is determined that the packet data is to be 'passed', the FW engine 329 transmits the packet data to an AP driver 321. After that, the AP driver 321 transmits the packet data to a mini port driver 317 and the mini port driver 317 transmits the packet data to FW applications through a TCP/IP protocol driver 315.

If the packet data contains data to be scanned such as a file, an AM application forms SOC transmission data to instruct to scan the file for viruses and transmits the SOC transmission data to a stream interface driver 311. The stream interface driver 311 transmits the SOC transmission data to the AP driver 321 and the AP driver 321 transmits the SOC transmission data to an AM manager 323. After that, the AM manager 323 parses the SOC transmission data and determines whether the SOC transmission data relates to scanning or filtering. Since the SOC transmission data relates to virus scanning in this exemplary embodiment, the SOC transmission data is transmitted to an AV manager 325 and the AV manager 325 identifies a command and instructs an AV engine 326 to perform a virus scanning operation. As described above, in the exemplary embodiment of FIG. 6, the AV engine 326 does not directly receive the data to be scanned from the FW engine 329 and receives the data thorough the AP driver 321.

The other elements of FIG. 6 perform the same or similar operations as those of FIG. 5 assigned similar numerals and thus a detailed description thereof is omitted.

Figure 7:
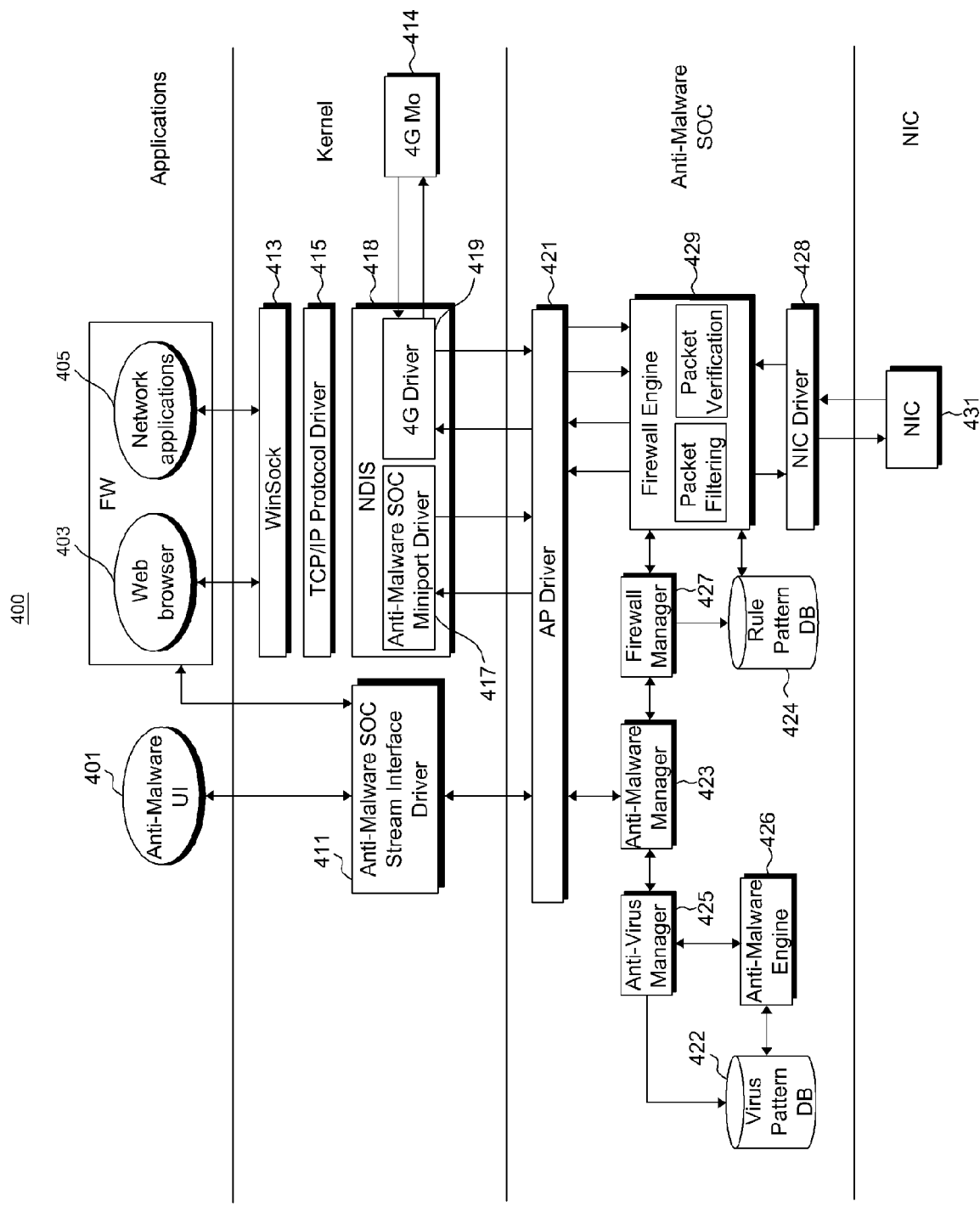
FIG. 7 is a block diagram illustrating a device according to still another exemplary embodiment.

FIG. 7 is a block diagram illustrating a device 400 according to still another exemplary embodiment.

Comparing the device 400 in the exemplary embodiment of FIG. 6, the device in the exemplary embodiment of FIG. 7 further includes a 4G modem 414 to transmit and receive packet data through a data network of mobile communication, and a 4G driver 419.

The 4G modem 414 may receive packet data from an external data network of mobile communication.

The 4G driver 419 transmits the packet data received by the 4G modem 414 to an AP driver 421, and the AP driver 421 transmits the packet data to an FW engine 429. After that, the FW engine 429 goes through a packet verification process and performs a packet filtering operation. If it is determined that the packet data is to be 'passed', the FW engine 429 returns the packet data to the AP driver 421 and the AP driver 421 transmits the packet data to a TCP/IP protocol driver 415, and the TCP/IP protocol driver 415 transmits the packet data to an FW application.

Hereinafter, an operation of transmitting the packet data from the FW application through the 4G modem 414 will be explained. If the FW application instructs the TCP/IP protocol driver 415 to transmit data, the TCP/IP protocol driver 415 generates packet data and transmits the packet data to the AP driver 421. The AP driver 421 transmits the packet data to the FW engine 429 and the FW engine 429 goes through a packet verification process and performs a packet filtering operation with respect to the packet data. Only if it is determined that the packet data is to be 'passed', the FW engine 429 transmits the packet data to the AP driver 421 and the AP driver 421 transmits the packet data to the 4G driver 419. After that, the 4G driver 419 transmits the packet data to the 4G modem 414 and the 4G modem 414 transmits the packet data to the external data network of mobile communication.

In the exemplary embodiment of FIG. 7, the packet data may be exchanged through an NIC 431 other than the 4G modem 414. The exemplary embodiment of FIG. 7 is the same as the exemplary embodiment of FIG. 6 except for that the device further includes the 4G modem 414 and the 4G driver 419. The other elements of FIG. 7 perform the same or similar operations as those of FIG. 6 assigned similar numerals and thus a detailed explanation thereof is omitted.

Figure 8:
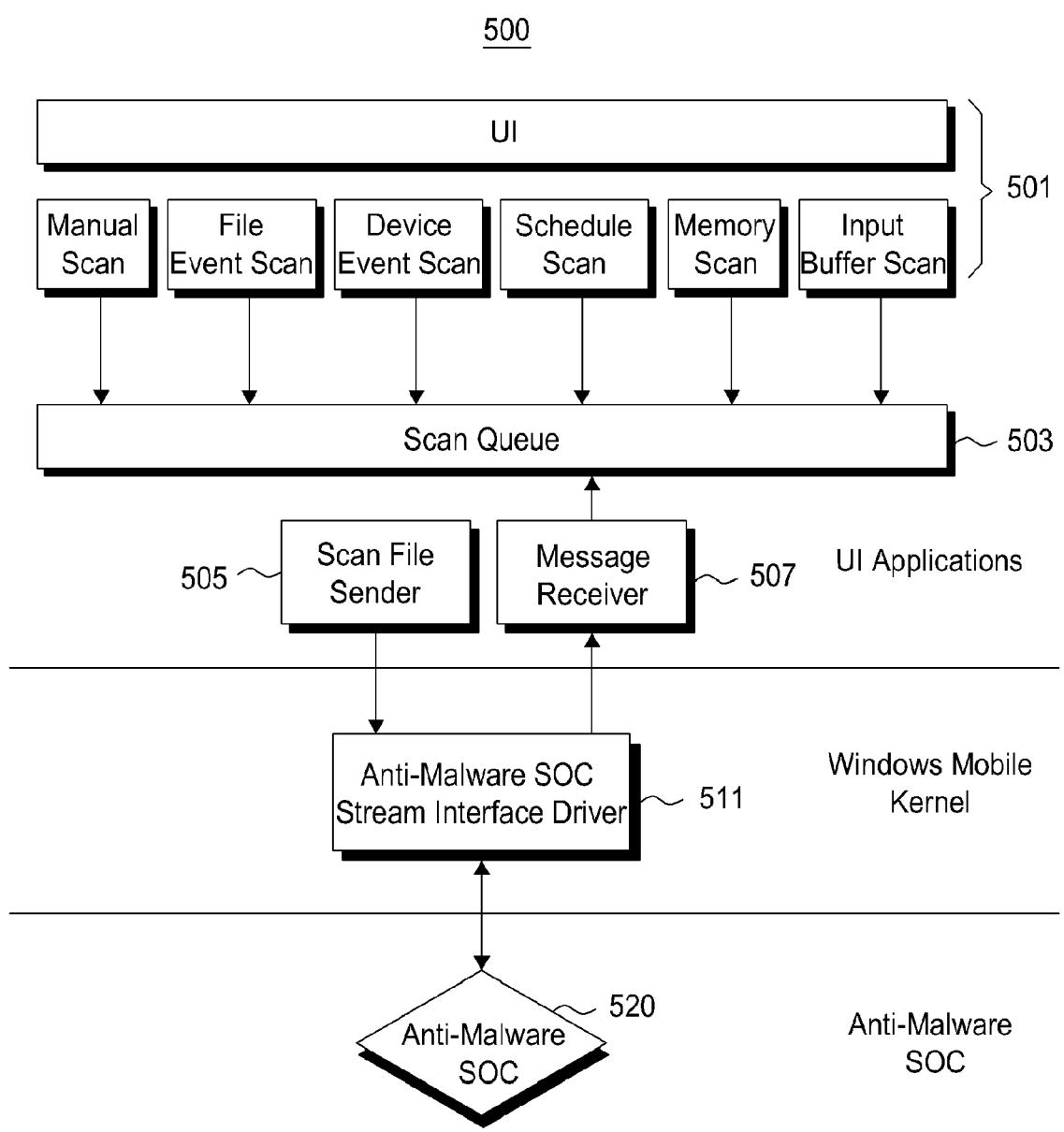
FIG. 8 is a view to explain an anti-virus (AV) user interface (UI) according to an exemplary embodiment.

FIG. 8 is a block diagram to explain an AV UI application according to an exemplary embodiment. A device 500 according to the exemplary embodiment of FIG. 8 includes a scan file sender 505 to transmit a file to be scanned (scanning data) to a file stream driver, and a message receiver 507 to receive a result of AV scanning from an AM SOC 520. It should be understood that elements not significantly related to the transmission of the scanning data are not illustrated in FIG. 8 for convenience of explanation.

Referring to FIG. 8, an AV UI application may receive at least one of a manual scanning command, a file event scanning command, a device event scanning command, a schedule scanning command, a memory scanning command, and an input buffer scanning command from a user. The AV UI application stores the scanning command input by the user in a scan queue 503 and the scan file sender 505 carries out the scan command stored in the scan queue 503 in sequence. In other words, the scan file sender 505 forms SOC transmission data including the scanning command stored in the scan queue 503 and data to be scanned and transmits the SOC transmission data to a stream interface driver 511. The stream interface driver 511 transmits the SOC transmission data to the AM SOC 520. The AM SOC 520 performs a scanning operation with respect to the data to be scanned included in the SOC transmission data, and transmits a result of the scanning operation to the stream interface driver 511. The stream interface driver 511 transmits the result of the scanning operation to the message receiver 507. The message receiver 507 transmits the result of the scanning operation to the scan queue 503 and the AV UI application displays the result of the scanning operation stored in the scan queue 503 for the user.

In the exemplary embodiment of FIG. 8, the scan file sender 505 to send the data to be scanned and the message receiver 507 to receive the result of the scanning operation are separately provided. However, the AV UI application may be adapted to include the functions of the scan file sender 505 and the message receiver 507. If the scan file sender 505 and the message receiver 507 are not separately provided in this specification, it should be understood that the AV UI application includes the functions thereof. Also, if an FW command sender 605 and an FW command receiver 607, which will be described below, are not separately provided, it should be understood that an FW UI application includes functions thereof.

Although a dedicated application to transmit the scanning data to the AM SOC 520 has been described in the exemplary embodiment of FIG. 8, a dedicated application to transmit virus pattern DB data to the AM SOC 520 may be provided. Such a dedicated application will be explained below with reference to FIG. 10.

Figure 10:
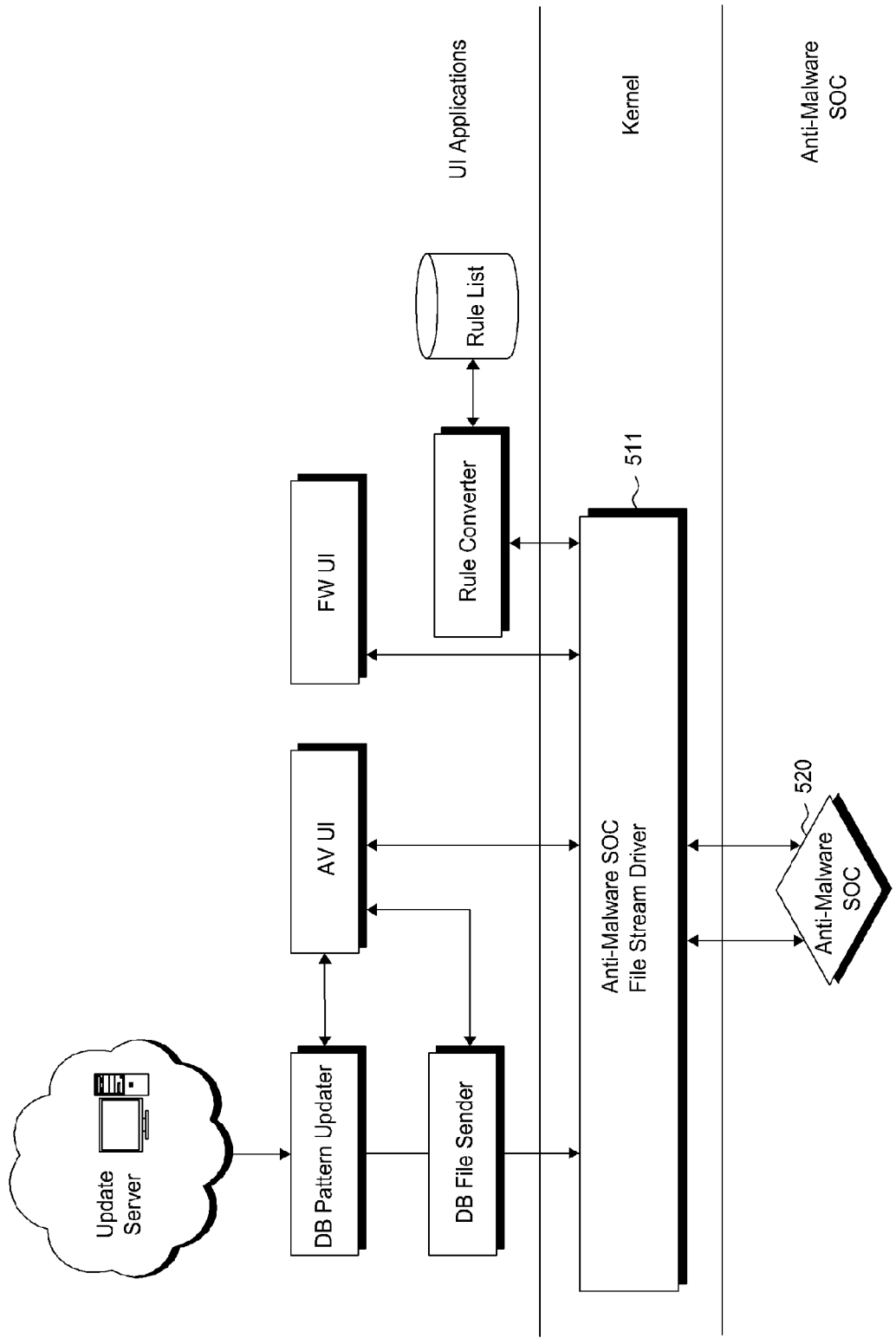
FIG. 10 is a view to explain updating operations of the AV UI and the FW UI according to an exemplary embodiment.

According to an exemplary embodiment, the AV UI application may include all of the functions related to the scanning operation. However, as illustrated in FIG. 8 or FIG. 10, dedicated applications to perform some of the functions of the AV UI application dedicatedly (for example, a scan file sender or a DB file sender) may be separately provided. Similarly, the FW UI application may include all of the functions related to the filtering operation. However, dedicated applications to perform some of the functions of the FW UI application dedicatedly (for example, an FW command sender or a rule converter) may be separately provided.

Figure 9:
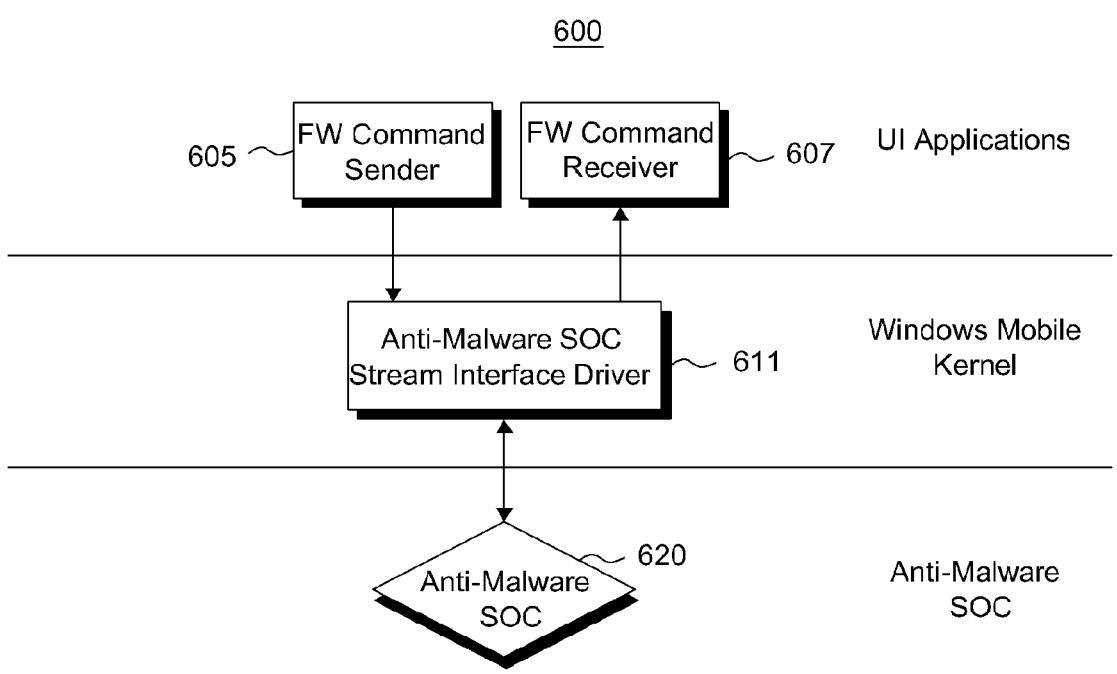
FIG. 9 is a view to explain a firewall (FW) UI according to an exemplary embodiment.

FIG. 9 is a block diagram to explain an FW UI application according to an exemplary embodiment. FIG. 9 illustrates a dedicated FW UI application to transmit an FW-related command and receive a result of carrying out the command. In FIG. 9, it should be understood that elements not significantly related to the transmission of the FW-related command are omitted for convenience of explanation.

An FW command sender 605 forms SOC transmission data with the FW-related command and transmits the SOC transmission data to a stream interface driver 611. The stream interface driver 611 transmits the SOC transmission data to a SOC 620. The SOC 620 interprets the SOC transmission data, carries out the command, and transmits a result of carrying out the command to the stream interface driver 611. The stream interface driver 611 transmits the result to an FW command receiver 607.

FIG. 10 is a block diagram to explain updating operations of the AV UI application and the FW UI application according to an exemplary embodiment.

In the exemplary embodiment of FIG. 10, dedicated applications for updating (a DB pattern updater and a DB file sender) are provided.

Referring to FIG. 10, the AV UI application determines whether a time to update a virus pattern DB has arrived or not by referring to virus scanning setting information stored in the storage unit 130. If it is determined whether a time to update has arrived, the AV UI application instructs the DB pattern updater to update. The DB pattern updater requests an update server to transmit a virus pattern DB for updating, if any. If the DB pattern updater receives the virus pattern DB for updating from the update server, the DB pattern updater requests the DB file sender to transmit data to be updated to the AM system 120. The DB file sender forms SOC transmission data for the virus pattern DB for updating and transmits the SOC transmission data to the anti-malware SOC file stream driver 511. The anti-malware SOC file stream driver 511 receives the SOC transmission data from the DB file sender and transmits the SOC transmission data to the anti-malware SOC 520.

An operation of updating a rule pattern DB by the FW UI application will be explained.

The FW UI application receives a filtering rule regarding packet data from the user, and stores the filtering rule in a storage unit (not shown). A rule converter converts the rule input by the user to a rule list and detects a collision between the rules. If a collision between the rules is detected, the rule converter notifies the FW UI application of the rule collision and the FW UI application notifies the user of the rule collision.

Table 1 shows an example of the filtering rule before the filtering rule is converted, and Table 2 shows an example of the rule list converted by the rule converter:

TABLE 1

| Name | IP | Protocol | Min Port | Max Port | Dir | local device | Mac | Act. |
|---|---|---|---|---|---|---|---|---|
| internal 2 | 192.168.2.111/27 | * | * | * | * | * | * | Allow |

In the Table 1, the IP address "192.168.2.111/27" includes both an IP address and a subnet mask. That is, "/27" denotes a prefix of a subnet mask and it means that the subnet mask is "255.255.255.224".

TABLE 2

| Variable Name | Type | Value |
|---|---|---|
| rule_id | unsigned char | 0x2 |
| Name | char* | "interior 2" |
| Id | unsigned int[4] | 0xC0A80000(decimal:192.168.0.0) |
| Netmask | unsigned int[4] | 0xFFFFFF00(decimal:255.255.0.0) |
| Protocol | unsigned chart | 0x0 |
| min_port | unsigned short | 0x0 |
| max_port | unsigned short | 0x0 |
| Direction | unsigned char | 0x0 |
| interface_ip | unsigned int[4] | 0x0 |
| mac_addr | unsigned int[4] | 0x0 |
| ip_version | unsigned char | 0x4(meaning IPv4) |
| Action | unsigned char | 0x1 |

The rule converter forms SOC transmission data for the converted rule list of a predetermined format, and transmits the SOC transmission data to the anti-malware SOC file stream driver 511. The anti-malware SOC file stream driver 511 transmits the SOC transmission data for the rule list to the anti-malware SOC 520.

In the present exemplary embodiment, the rule converter may form the SOC transmission data by calling the functions stored in a storage unit of a device in which the AM SOC 520 is mounted, and the SOC transmission data for the rule list may have the format shown in FIG. 11. Herein, the command item may include a command to update the rule pattern DB, and the data item may include a rule list for updating.

FIG. 11 is a view to explain SOC transmission data according to an exemplary embodiment.

As described above, the SOC transmission data shown in FIG. 11 includes the command item indicating a command, the reserved item, the data size item and the data item. In the above-described exemplary embodiments, the stream interface driver transmits or receives only the SOC transmission data. The data size item indicates a size of data included in the data item and the data item may include scanning data or updating data.

The AM manager identifies a command of the SOC transmission data and determines what service the SOC transmission data relates to, i.e., what service is provided by the SOC. Then, the AM manager transmits the SOC transmission data to the AV manager or the FW manager. The service that is provided by the SOC may be a service related to virus scanning or packet data filtering.

The AV manager identifies a command included in the SOC transmission data and performs an operation corresponding to the command. For example, if the command relates to virus scanning, the AV manager instructs the AV engine to scan data included in the data item of the SOC transmission data for viruses.

The FW manager identifies a command included in the SOC transmission data and performs an operation corresponding to the command. For example, if the command relates to updating of a rule pattern DB, the FW manager converts data included in the data item of the SOC transmission data to a rule pattern, and update a pre-stored rule pattern DB with the converted rule pattern.

According to an exemplary embodiment, the FW application or the AV application forms the SOC transmission data by calling at least one of the operations of the function library for the operation of the SOC. In present disclosure, even if it is not explained that the above-described functions are called when the SOC transmission data is generated, it should be understood that the functions are called when the SOC transmission data is generated.

Figure 12:
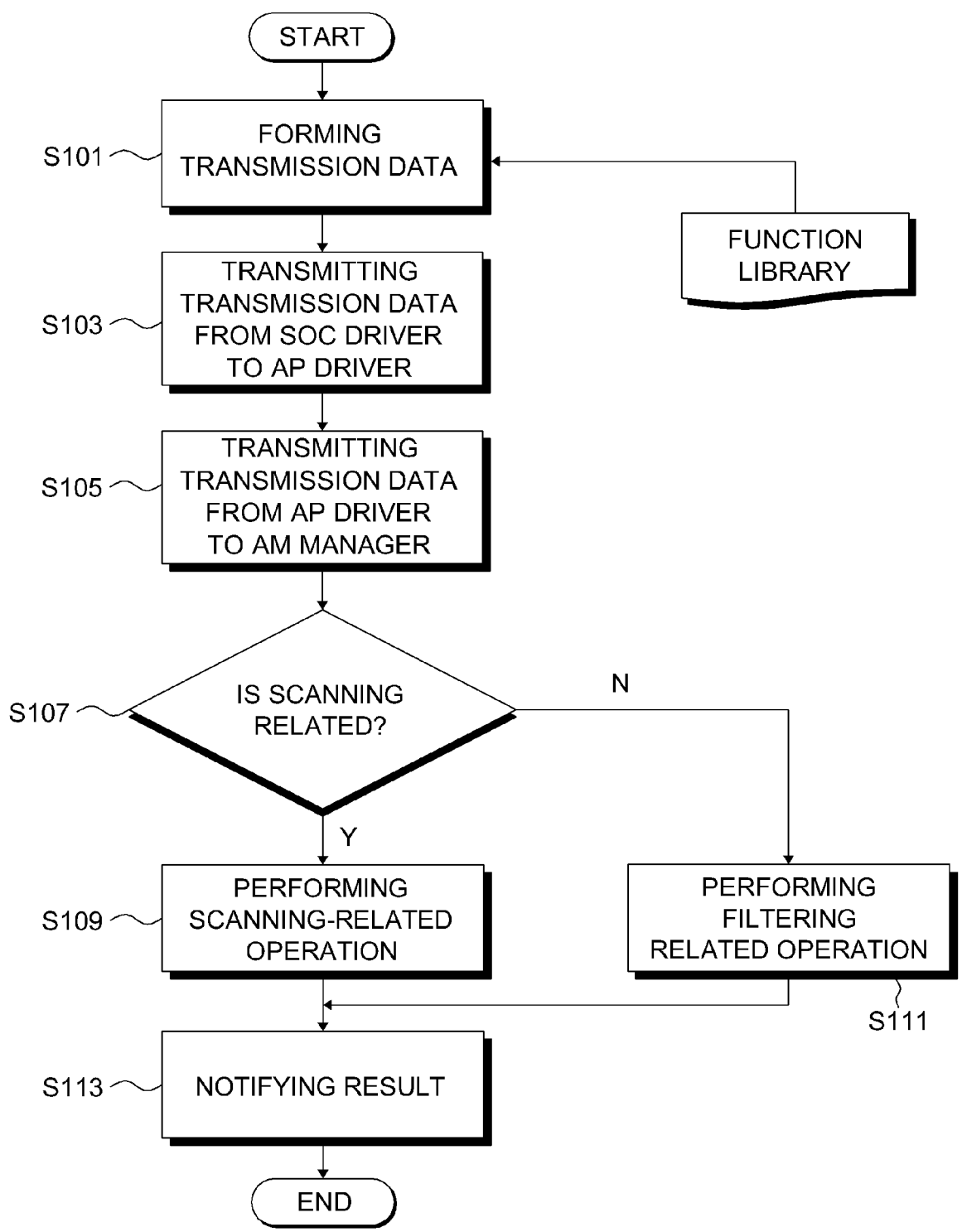
FIG. 12 is a flowchart illustrating a method of providing an anti-malware service according to an exemplary embodiment.

FIG. 12 is a flowchart illustrating a method of providing an anti-malware service according to an exemplary embodiment. The method of providing the anti-malware service will be explained by applying the exemplary embodiment of FIG. 6, but this is merely an example and the method may be realized with other exemplary embodiments.

Referring to FIGS. 6 and 12, an AM UI application 301 generates SOC transmission data using at least one function included in the function library for the operation of the SOC (operation S101). The function library is stored in a storage unit (not shown) of the device 300 and is loaded into a memory (not shown) of the device 300 by a calling of the AM UI application 301.

The AM UI application 301 transmits the SOC transmission data to the stream interface driver 311 and the stream interface driver 311 transmits the SOC transmission data to the AP driver 321 (operation S103).

The AP driver 321 transmits the SOC transmission data to the AM manager 323 (operation S105), and the AM manager 323 identifies a command included in the SOC transmission data and determines whether the command relates to virus scanning or not (operation S107). If the command relates to virus canning (operation S107: Y), the AV manager 423 or the AV engine 326 performs an operation corresponding to the command (operation S109). For example, if the command is an instruction to perform virus scanning, the AV engine 326 performs a virus scanning operation, and, if the command is an instruction to update, the AV manger 325 updates a virus pattern DB.

If the command is not related to the scanning (S107: N), the FW manager 327 performs a filtering operation (operation S111).

The FM manager 323 receives a result of carrying out the command from the AV manager 325 or the FW manager 327 and transmits the result of carrying out the command to the stream interface driver 311 through the AP driver 321, and the stream interface driver 31 transmits the result to the AM UI application 301 (operation S113).

Figure 13:
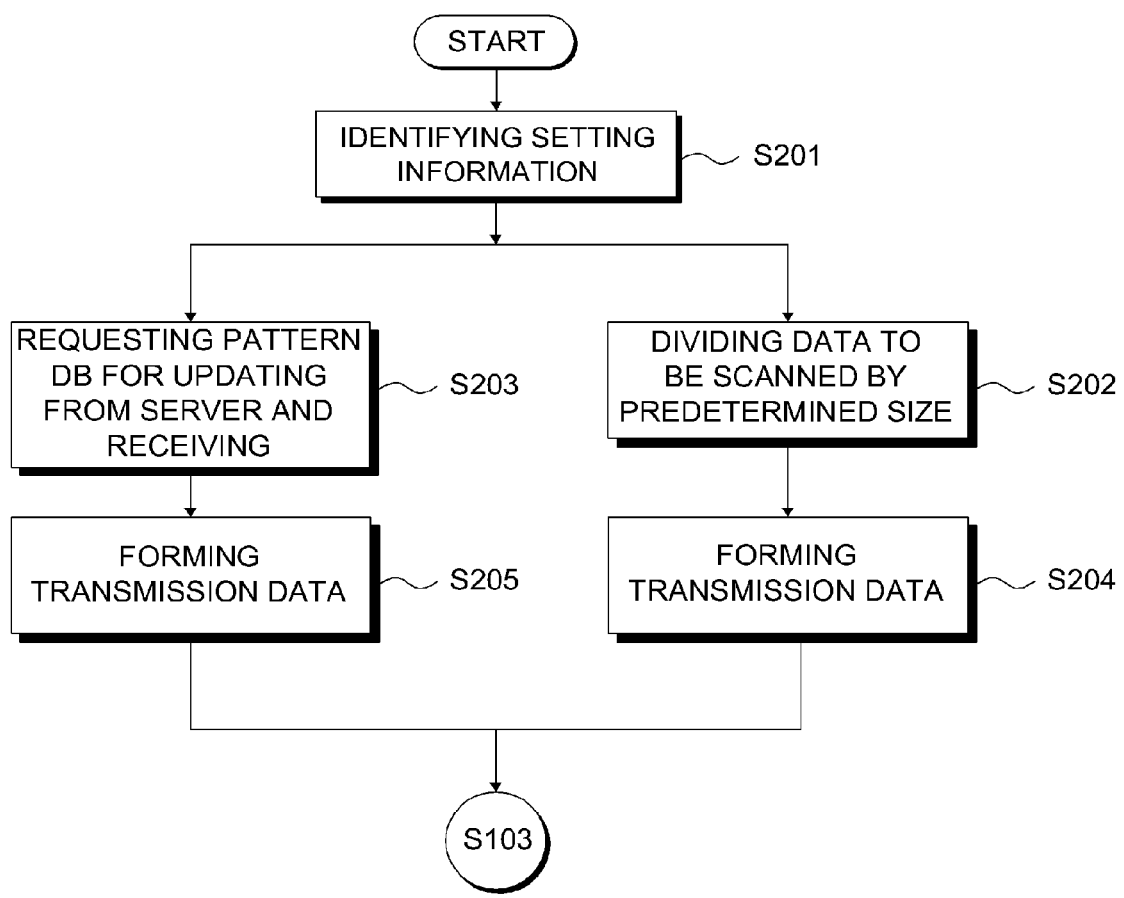
FIG. 13 is a flowchart illustrating an operation of the AV UI according to an exemplary embodiment.

FIG. 13 is a flowchart illustrating an operation of the AV UI application according to an exemplary embodiment. The operation of the AV UI application will be explained by applying the exemplary embodiment of FIG. 1. However, this is merely an example and the operation of the AV UI application may also be achieved by applying other exemplary embodiments.

Referring to FIGS. 1 and 13, the AV UI application identifies setting information regarding virus scanning stored in the storage unit 130 (operation S201). The setting information may indicate a scanning schedule of a virus pattern or an update schedule of a virus pattern DB.

If it is determined that a time to update has arrived, the AV UI application requests an update server (not shown) to transmit a virus pattern DB for updating and receives the virus pattern DB for updating (operation S203). Then, the AV UI application generates SOC transmission data with the virus pattern DB for updating (operation S205) and transmits the SOC transmission data to the SOC driver, and the SOC driver transmits the SOC transmission data to the AP driver. The next operations may follow the operations after operation S103 of FIG. 12.

If it is determined that a time to scan viruses has arrived, the AV UI application divides data to be scanned according to a predetermined size (operation S202). The AV UI application forms SOC transmission data with each of the divided data (operation S204) and then transmits the SOC transmission data to the SOC driver. The SOC driver transmits the SOC transmission data to the AP driver. The next operations may follow the operations after operation S103 of FIG. 12.

Figure 14:
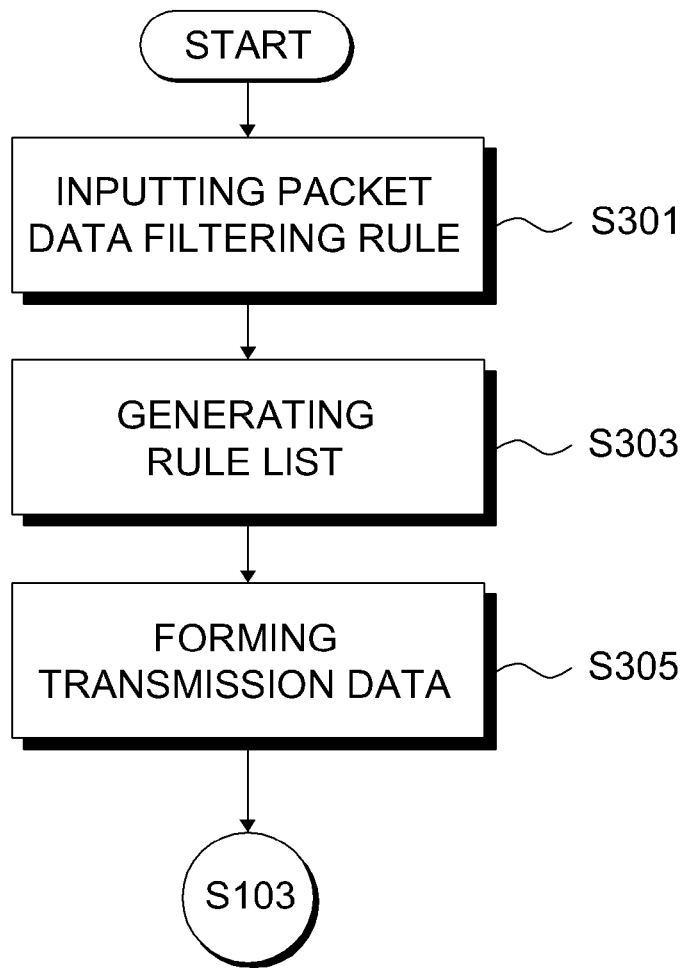
FIG. 14 is a flowchart illustrating an operation of the FW UI according to an exemplary embodiment.

FIG. 14 is a flowchart illustrating an operation of the FW UI application according to an exemplary embodiment. The operation of the FW UI application will be explained by applying the exemplary embodiment of FIG. 10. However, this is merely an example and the operation of the FW UI application may also be achieved by applying other exemplary embodiments.

Referring to FIGS. 10 and 14, the FW UI application receives a filtering rule regarding packet data from the user (operation S301). The rule converter converts the filtering rule input by the user into a rule list of a predetermined format (operation S303). The rule converter forms SOC transmission data including the rule list and transmits the SOC transmission data to the stream interface driver 511 (operation S305). The next operations may follow the operations after operation S103 of FIG. 12.

Figure 15:
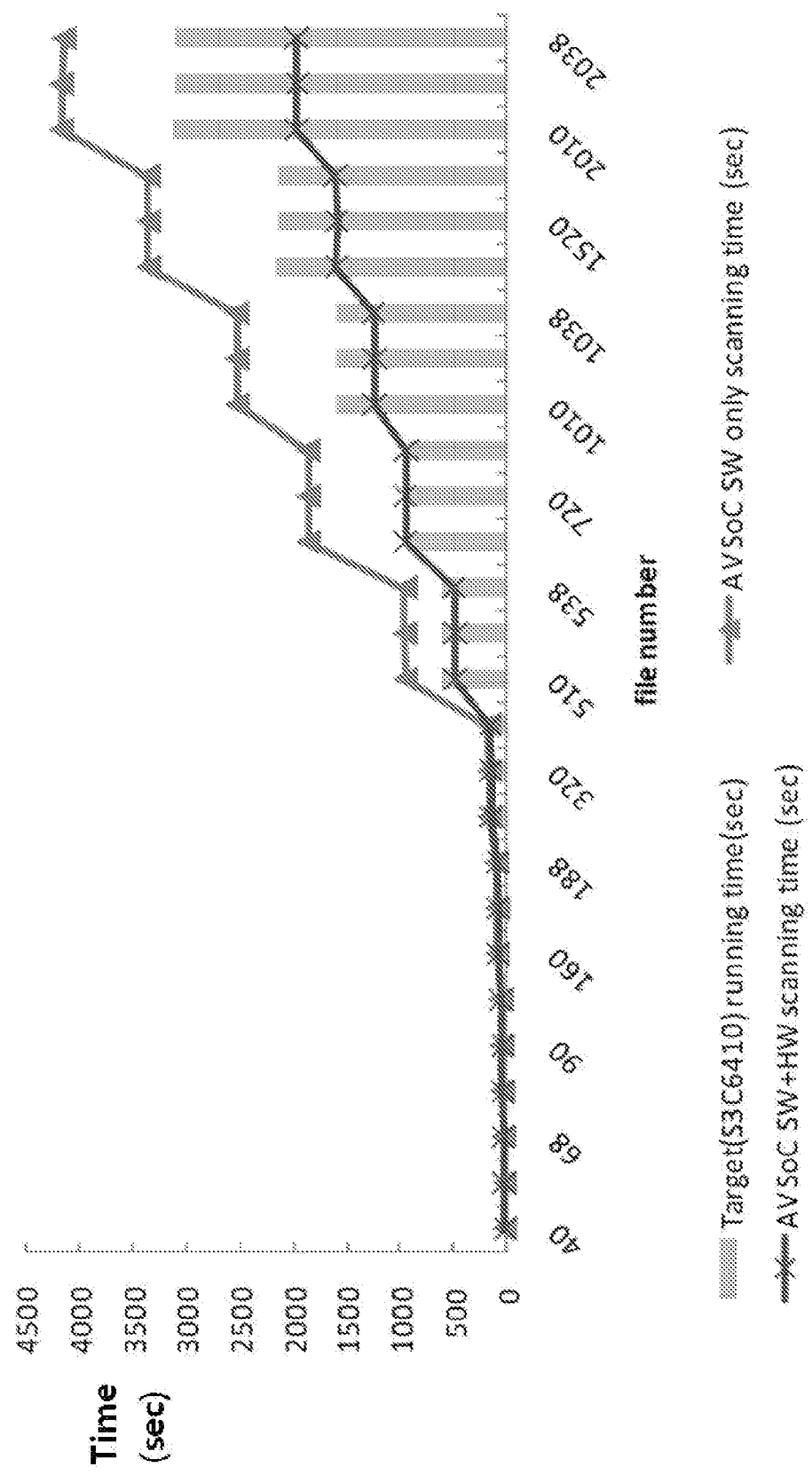
FIGS. 15 to 18 are views to explain effects of the SOC according to exemplary embodiments.

FIG. 15 illustrates a scanning speed when an anti-virus scanning engine using the same algorithm is tested for a malware scanning operation on an application layer (hereinafter, referred to as 'TEST 1') and a scanning speed when a SOC-based anti-virus scanning engine is tested for a malware scanning operation.

In FIG. 15, the scanning speed of TEST 1 is expressed by bars and results of testing the SOC-based anti-virus engine are expressed by curved lines. The lower curved line indicates a result of performing malware scanning using a SOC-based anti-virus engine configured by software and hardware logic (hereinafter, referred to as 'TEST 2'), and the upper curved line indicates a result of performing malware scanning using a SOC-based anti-virus engine configured only by software (hereinafter, referred to as 'TEST 3').

In FIG. 15, TEST 1 uses a CPU of 800 MHz, and TEST 2 and TEST 3, which are done on an FPGA board for a SOC, use a CPU of 50 MHz. Accordingly, if the tests are done using a CPU having the same speed, it is expected that TEST 2 and TEST 3, which are done on the SOC, have much higher scanning speeds than that of TEST 1.

FIG. 15 indicates that TEST 2 requires more time to scan than TEST 1. However, if a difference in the speed of CPUs is considered, it is predicted that the SOC-based anti-malware engine configured only by software requires less time to scan than the anti-malware engine operated on the application layer.

On the other hand, TEST 3 has a higher scanning speed than TEST 1 despite the difference in the speed of the CPUs. In other words, if the number of files to be scanned exceeds 2,000, the scanning speed of TEST 3 is 1.5 times higher than the scanning speed of TEST 1.

Figure 16:
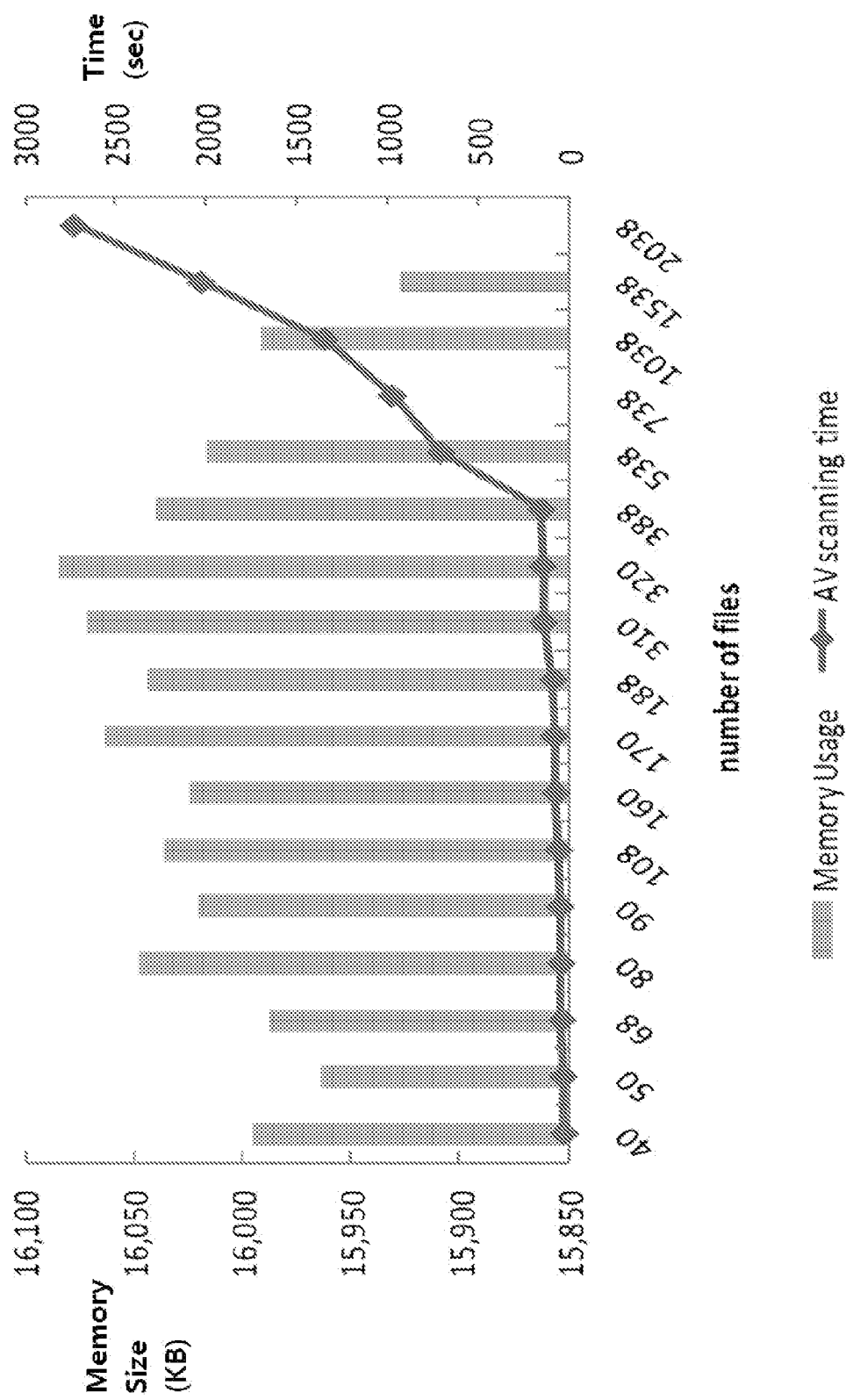

FIG. 16 illustrates memory usage and a scanning time when a malware scanning is performed using a mobile non-SOC-based and commercialized anti-virus engine.

In FIG. 16, bars indicate memory usage for the malware scanning, and a curved line indicates a time required for the malware scanning. In FIG. 16, a CPU of 800 MHz is used. As shown in FIG. 16, the memory usage of the non-SOC-based anti-virus engine is high even in a state where the number of files is low.

Also, FIG. 16 indicates that the bar height is reduced as the number of files is more than 320. However, this is because of a swapping operation of the memory. If the number of files to be scanned increases to a point higher than the memory is able to handle, the operating system may perform a swapping operation of the memory. The swapping operation may increase the scanning time and consequently battery consumption increases.

Figure 17:
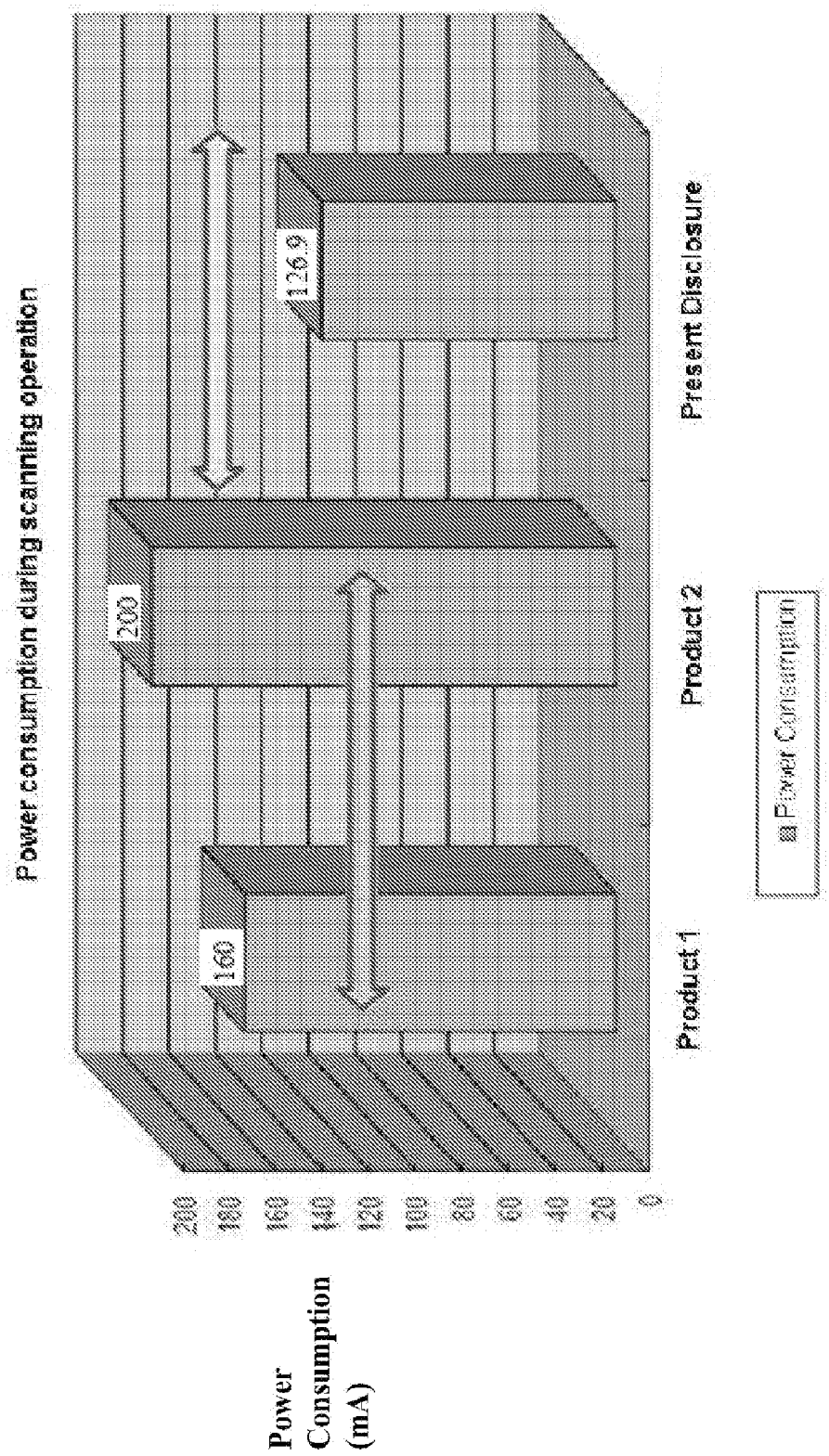

FIG. 17 illustrates power consumption of anti-virus engines, as a result of testing commercialized products and a SOC-based anti-virus engine according to an exemplary embodiment.

Referring to FIG. 17, the commercialized product 1 and the commercialized product 2 to be compared are anti-virus engines realized only by software, not based on SOC, and consume about 160 mA and about 200 mA, respectively. On the other hand, the SOC-based anti-virus scanning engine according to an exemplary embodiment is an engine configured by software and hardware logic and consumes about 126.9 mA.

Figure 18:
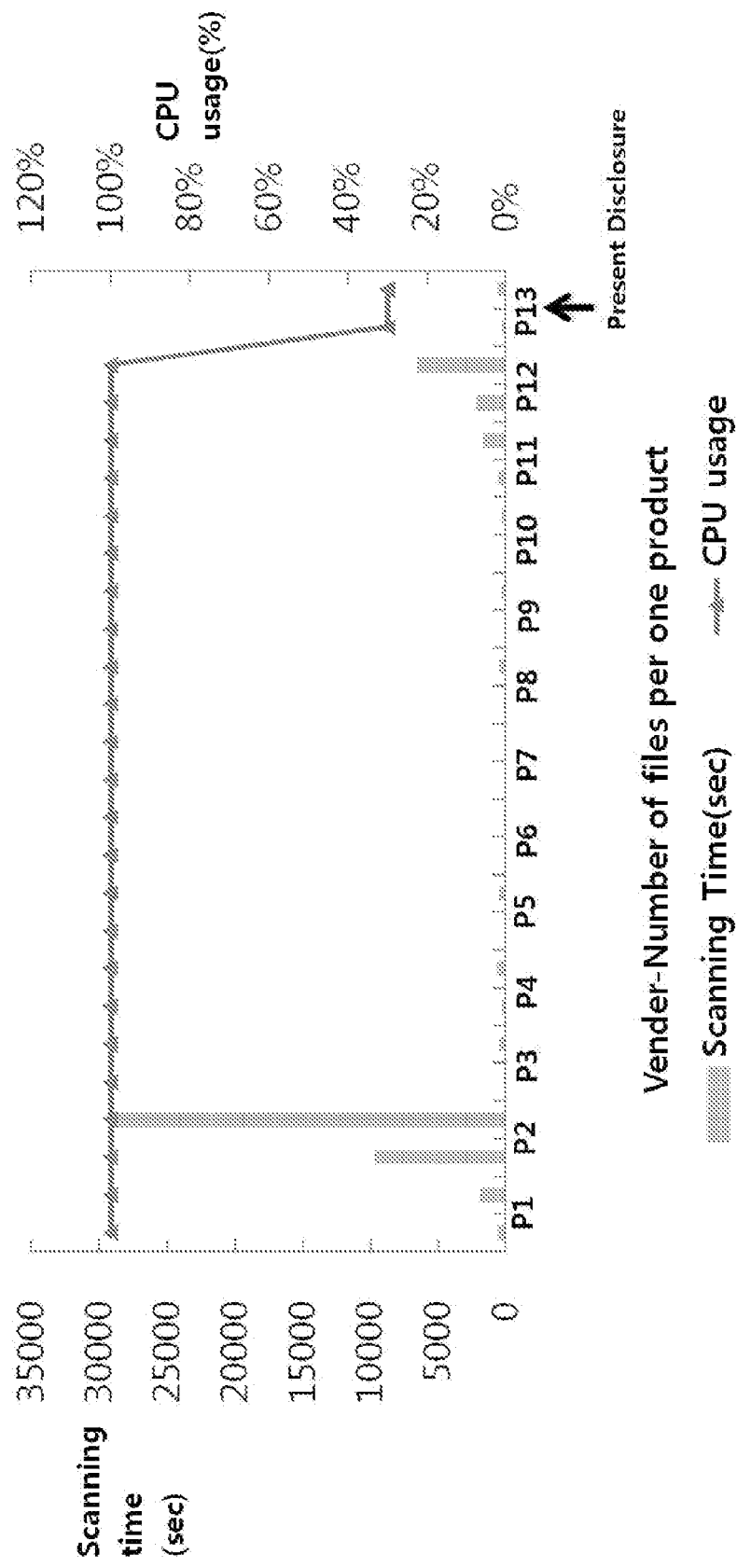

FIG. 18 illustrates a malware scanning time and a CPU usage time, as a result of testing products for use in a mobile phone and a SOC-based anti-virus engine according to an exemplary embodiment.

FIG. 18 illustrates results of testing the products P1, P2, P3, P4, P5, P6, P7, P8, P9, P10, P11, P12 and the SOC-based anti-virus engine P13 according to an exemplary embodiment two times for each product with different numbers of files to be scanned.

In FIG. 18, the CPU usage of the commercialized products is almost 100% and is much higher than that of the SOC-based anti-virus engine P13. As the CPU usage and the scanning time increase, battery consumption increases. Therefore, the present exemplary embodiment has an effect of reducing battery consumption.

In addition, the preset exemplary embodiment P13 is tested using an FPGA board having a CPU of 50 MHz, whereas the products use CPUs of several hundred MHz to several GHz. Therefore, it is predicted that the present exemplary embodiment is greatly superior to the products in view of the CPU usage or the scanning time if the test is done under the same condition.

The exemplary embodiments described above may be realized as a computer-readable code in a computer-readable recording medium. The computer-readable recording medium includes all types of recording apparatuses storing data readable by a computer system. Examples of such a computer-readable recording medium are a read only memory (ROM), a random access memory (RAM), a CD-ROM, a magnetic tape, a floppy disk, and an optical data storage device, and also may be realized in the form of carrier wave (for example, transmission through Internet). The computer-readable recording medium is distributed over the computer system connected to a network, and stores and executes the computer-readable code in a distributed manner.

According to exemplary embodiments, by providing an interface for an anti-malware SOC, the anti-malware SOC is used dedicatedly, and a separate malware scanning engine is added to an application terminal rather than the SOC as a multi-engine to be able to deal with various viruses along with the anti-malware SOC. Also, the anti-malware scanning operation and the filtering operation of high loads are performed through the SOC, so that use of resources of the device such as a battery, a CPU, or a memory is minimized. Also, by performing security works through the application terminal and the SOC terminal, a safer security solution can be provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A mobile device comprising:
a system-on-chip (SOC) comprising an anti-malware system and a firewall (FW) application executed by the SOC, wherein the SOC filters packet data and the FW application receives the data filtered by the SOC;
a storage unit which stores a library which is a collection of operations provided for use in the SOC providing the anti-malware system; and
a scanning data sender which runs on an operating system that is external to the SOC and is executed by the mobile device, forms SOC transmission data with scanning data to be scanned for viruses by calling at least one of the operations, and transmits the SOC transmission data to the SOC from a location external to the SOC; and
a sender, wherein the SOC stores a pattern rule DB and the sender transmits, to the SOC, data for updating the pattern rule DB stored in the SOC,
wherein the operations relate to at least one of virus scanning, packet data filtering, virus pattern database (DB) updating, rule pattern DB updating, encrypting and decrypting, and hash value calculating, which are performed in the SOC,
wherein the scanning data sender forms the SOC transmission data to comprise an item indicating a type of the anti-malware system, the scanning data, and a command to scan, and
wherein the SOC comprises a malware manager which determines what type of the anti-malware system is related to the SOC transmission data.

2. The mobile device as claimed in claim 1, further comprises:
a communication interface unit which operates the SOC using the library; and
a protocol unit which exchanges an operating command and an operation with the SOC through the communication interface unit.

3. The mobile device as claimed in claim 1, wherein the scanning data sender forms the SOC transmission data to comprise the scanning data and the command to scan.

4. The mobile device as claimed in claim 1, wherein the SOC stores a malware pattern DB which is used for scanning the scanning data.

5. The mobile device as claimed in claim 4, further comprising a sender which transmits data for updating the malware pattern DB stored in the SOC to the SOC.

6. The mobile device as claimed in claim 1, further comprising a message receiver which is notified by the SOC of a result of scanning the scanning data.

7. A method of providing a system-on-chip (SOC)-based anti-malware service of a mobile device, the method comprising:
forming, by the mobile device, SOC transmission data comprising a command and an item indicating a type of the anti-malware service; and
transmitting, by a scanning data sender on the mobile device which runs on an operating system that is external to the SOC and is executed by the mobile device, the SOC transmission data to an SOC mounted in the mobile device, from a location external to the SOC,
wherein the SOC performs a virus scanning operation or a packet filtering operation according to the command included in the SOC transmission data,
wherein the SOC determines whether the anti-malware service relates to the packet filtering operation or the virus scanning operation by referring to the item of the SOC transmission data indicating the type of the anti-malware service,
wherein the SOC stores a rule pattern DB for the packet filtering operation and a virus pattern DB for the virus scanning operation,
wherein the SOC transmission data comprising the command and the item indicating the type of the anti-malware service is at least one of:
first SOC transmission data comprising virus scanning data and a first command to scan;
second SOC transmission data comprising a virus pattern DB for updating and a second command to update a virus pattern DB; and
third SOC transmission data comprising a filtering rule list for updating and a third command to update a rule pattern DB, and
wherein the second SOC transmission data further comprises a hash coefficient which is generated based on the virus pattern DB pre-stored in the SOC and the virus pattern DB for updating.

8. The method as claimed in claim 7, wherein the SOC simultaneously performs the packet filtering operation and the virus scanning operation with respect to data to be filtered.

9. The method as claimed in claim 7, further comprising dividing, by the mobile device, scanning data by a predetermined size,
wherein the first SOC transmission data comprises the divided scanning data.

10. The method as claimed in claim 7, wherein the mobile device stores a library which is a collection of operations for use in the SOC and forms the SOC transmission data by calling at least one of the operations.

11. The method as claimed in claim 10, wherein the operations relate at least one of virus scanning, packet data filtering, virus pattern DB updating, and rule pattern DB updating, which are performed in the SOC.

12. A method of providing a system-on-chip (SOC)-based anti-malware service, the method comprising:
storing a library which is a collection of operations for use in a SOC in a mobile device in which the SOC is mounted;
forming, by the mobile device, SOC transmission data with scanning data to be scanned for viruses by calling at least one of the operations included in the library; and
transmitting, by a scanning data sender on the mobile device which runs on an operating system that is external to the SOC and is executed by the mobile device, the SOC transmission data for the scanning data to the SOC, from a location external to the SOC,
wherein the operations relate to at least one of virus scanning, packet data filtering, virus pattern DB updating, and rule pattern DB updating, which are performed in the SOC,
wherein the SOC determines whether the anti-malware service relates to the packet filtering operation or the virus scanning operation by referring to an item of the SOC transmission data indicating a type of the anti-malware service,
wherein the SOC stores a rule pattern DB for the packet filtering operation and a virus pattern DB for the virus scanning operation,
wherein the SOC transmission data comprising a command and the item indicating the type of the anti-malware service is at least one of:
first SOC transmission data comprising virus scanning data and a first command to scan;
second SOC transmission data comprising a virus pattern DB for updating and a second command to update a virus pattern DB; and
third SOC transmission data comprising a filtering rule list for updating and a third command to update a rule pattern DB, and
wherein the second SOC transmission data further comprises a hash coefficient which is generated based on the virus pattern DB pre-stored in the SOC and the virus pattern DB for updating.

13. The method as claimed in claim 12, further comprising dividing, by the mobile device, the scanning data by a predetermined size,
wherein the transmitting comprises transmitting the divided scanning data to the SOC in sequence.

14. The method as claimed in claim 12, further comprising receiving, by the SOC, the virus pattern DB used for the virus scanning operation from the mobile device and storing the virus pattern DB,
wherein the SOC performs the virus scanning operation using the virus pattern DB.

15. The method as claimed in claim 14, further comprising:
forming, by the mobile device, SOC transmission data with the virus pattern DB for updating by calling at least one of the operations included in the library;
transmitting, by the mobile device, the SOC transmission data for the virus pattern DB for updating to the SOC; and
updating, by the SOC, a pre-stored virus pattern DB with the virus pattern DB included in the SOC transmission data for the virus pattern DB for updating.

16. The method as claimed in claim 12, further comprising performing, by the SOC, a filtering operation with respect to packet data,
wherein the formed SOC transmission data for the scanning data comprises the item indicating the type of the anti-malware service, the first command to scan, and the scanning data.

17. The method as claimed in claim 16, further comprising receiving, by the SOC, the filtering rule list from the mobile device, converting the filtering rule list into the rule pattern DB of a predefined format, and storing the rule pattern DB,
wherein the SOC performs the filtering operation with respect to the rule pattern DB.

18. The method as claimed in claim 16, further comprising forming, by the mobile device, SOC transmission data for a rule list defining the filtering operation by calling at least one of the operations included in the library, and transmitting the SOC transmission data to the SOC.

19. A non-transitory computer readable recording medium having recorded thereon a program executable by a computer for performing the method of claim 7.

20. A non-transitory computer readable recording medium having recorded thereon a program executable by a computer for performing the method of claim 12.

* * * * *